United States Patent
Strich et al.

(10) Patent No.: US 7,653,149 B2
(45) Date of Patent: Jan. 26, 2010

(54) DYNAMIC SECTORIZATION IN A SPREAD SPECTRUM COMMUNICATION SYSTEM

(75) Inventors: W. Eli Strich, La Jolla, CA (US); James H. Thompson, Carlsbad, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1340 days.

(21) Appl. No.: 10/021,865

(22) Filed: Dec. 17, 2001

(65) Prior Publication Data

US 2002/0054580 A1 May 9, 2002

Related U.S. Application Data

(63) Continuation of application No. 08/495,382, filed on Jun. 28, 1995, now Pat. No. 6,473,447, which is a continuation of application No. 08/195,003, filed on Feb. 14, 1994, now abandoned.

(51) Int. Cl.
*H04L 27/04* (2006.01)

(52) U.S. Cl. .................. 375/310; 375/347; 375/130; 375/147; 370/320; 370/206

(58) Field of Classification Search ............ 375/347, 375/130, 147, 310; 370/320, 206
See application file for complete search history.

(56) References Cited

U.S. PATENT DOCUMENTS

| | | | |
|---|---|---|---|
| 4,435,840 A | 3/1984 | Kojima et al. ............ | 455/33 |
| 4,485,486 A | 11/1984 | Webb et al. ............ | 455/33 |
| 4,549,311 A | 10/1985 | McLaughlin ............ | 455/277 |
| 4,652,880 A | 3/1987 | Moeller et al. ............ | 342/373 |
| 4,704,734 A | 11/1987 | Menich et al. ............ | 455/33 |

(Continued)

FOREIGN PATENT DOCUMENTS

CN 1063790 8/1992

(Continued)

OTHER PUBLICATIONS wales, "A spectrum efficient cellular base-station antenna architecture" This paper appears in: Antennas and Propagation Society International Symposium, 1992. AP-S. 1992 Digest. Held in conjunction with: URSI Radio Science Meeting and Nuclear EMP Meeting., IEEE Publication Date: Jul. 18-25, 1992 On pp. 1069-1072 vol. 2 Meeting Date: Jul. 18, 1992.*

(Continued)

*Primary Examiner*—Juan A Torres
(74) *Attorney, Agent, or Firm*—Kenneth K. Vu; Kenyon S. Jenckes

(57) ABSTRACT

A system and method for dynamically varying traffic channel sectorization within a spread spectrum communication system is disclosed herein. In a preferred implementation the system is operative to convey information to at least one specified user in a spread spectrum communication system and includes multiple antennas, each having an associated coverage area, and each coupled to an antenna driver. The antenna drivers each include a delay element and an input summation node. A switching transmission network is disposed to selectively transmit via antennas. Selective transmission of signals results in variation in size of a given user sector. In another aspect, the system may be configured to selectively receive, and coherently combine, signals from different coverage areas.

39 Claims, 19 Drawing Sheets

U.S. PATENT DOCUMENTS

| | | | | |
|---|---|---|---|---|
| 4,726,050 | A | 2/1988 | Menich et al. | 379/60 |
| 4,750,036 | A | 6/1988 | Martinez | 358/147 |
| 4,901,307 | A | 2/1990 | Gilhousen et al. | 370/18 |
| 5,021,801 | A * | 6/1991 | Smith et al. | 343/876 |
| 5,048,116 | A | 9/1991 | Schaeffer | 455/33 |
| 5,103,459 | A | 4/1992 | Gilhousen et al. | 375/1 |
| 5,187,806 | A | 2/1993 | Johnson et al. | 455/15 |
| 5,193,109 | A | 3/1993 | Chien-Yeh Lee | 379/60 |
| 5,235,616 | A | 8/1993 | Sebilet | 375/1 |
| 5,241,685 | A | 8/1993 | Bodin et al. | 455/33.2 |
| 5,245,629 | A | 9/1993 | Hall | |
| 5,265,263 | A | 11/1993 | Ramsdale et al. | 455/33.2 |
| 5,276,907 | A * | 1/1994 | Meidan | 455/436 |
| 5,317,593 | A | 5/1994 | Fulghum et al. | 375/1 |
| 5,343,173 | A | 8/1994 | Balodis et al. | 333/126 |
| 5,404,576 | A | 4/1995 | Yahagi | 455/56.1 |
| 5,422,908 | A * | 6/1995 | Schilling | 375/130 |
| 5,428,817 | A * | 6/1995 | Yahagi | 455/446 |
| 5,428,818 | A | 6/1995 | Meidan et al. | 455/33.3 |
| 5,432,780 | A * | 7/1995 | Smith et al. | 370/297 |
| 5,596,333 | A * | 1/1997 | Bruckert | 342/457 |
| 5,621,752 | A * | 4/1997 | Antonio et al. | 375/144 |

FOREIGN PATENT DOCUMENTS

| | | |
|---|---|---|
| EP | 0591770 | 4/1994 |
| EP | 0635989 | 1/1995 |
| JP | 03-093326 | 4/1991 |
| JP | 05-167489 | 7/1993 |
| JP | 05-336027 | 12/1993 |
| JP | 05-344048 | 12/1993 |
| JP | 07-131845 | 5/1995 |
| WO | WO 9210890 | 6/1992 |
| WO | WO 9212601 | 7/1992 |
| WO | 9210074 | 6/1993 |
| WO | WO 9312587 | 6/1993 |
| WO | WO 9313605 | 7/1993 |

OTHER PUBLICATIONS

Naguib, Ayman F. et al., "Capacity Improvement with Base-Station Antenna Arrays in Cellular CDMA", *IEEE Transactions on Vehicular Technology*, vol. 43, No. 3, Aug. 1994, pp. 691-698.

Suzuki, Mitsuyoshi et al., "Frequency Re-using Pattern for Forward Link of Orthogonal CDMA Cellular Systems," *IEICE Trans. Commun.*, vol. E77-B, No. 6, Jun. 1994, pp. 838-842.

Swales, S.C. et al. "A Spectrum Efficient Cellular Base-Station Antenna Architecture", Sixth International Conference on Mobile Radio and Personal Communications, Conference Publication No. 351, pp. 272-279, 1991.

Swales, S.C. et al., "Multi-Beam Adaptive Base-Station Antennas for Cellular Land Mobile Radio Systems", 39th IEEE Vehicular Technology Conference, vol. 1, May 1-3, 1989 San Francisco, California, pp. 341-348.

"Smart Antenna Module," Northern Telecom Inc., Oct. 5, 1993, 4 pages.

"PCS 1900 Advanced Services Generating Revenue for PCS Providers," Northern Telecom Inc., Sep. 1993, 13 pgs.

European Search Report EP03005274, Search Authority Berlin, Feb. 6, 2004.

International Search Report PCT/US1995/001831, International Search Authority European Patent Office Oct. 9, 1995.

\* cited by examiner

DYNAMIC SECTORIZATION IN A SPREAD SPECTRUM COMMUNICATION SYSTEM

CROSS REFERENCE

This Application is a continuation of U.S. application Ser. No. 08/495,382, filed Jun. 28, 1995 now U.S Pat. No. 6,473,447 which is a file wrapper continuation of U.S. application Ser. No. 08/195,003, filed Feb. 14, 1994 now abandoned, entitled "Dynamic Sectorization in a Spread Spectrum Communication System."

BACKGROUND OF THE INVENTION

I. Field of the Invention

The present invention relates to communication systems utilizing spread spectrum signals, and, more particularly, to a novel and improved method and apparatus for dynamic channel sectorization within a spread spectrum communication system.

II. Description of the Related Art

Communication systems have been developed to allow transmission of information signals from a source location to a physically distinct user destination. Both analog and digital methods have been used to transmit such information signals over communication channels linking the source and user locations. Digital methods tend to afford several advantages relative to analog techniques, including, for example, improved immunity to channel noise and interference, increased capacity, and improved security of communication through the use of encryption.

In transmitting an information signal from a source location over a communication channel, the information signal is first converted into a form suitable for efficient transmission over the channel. Conversion, or modulation, of the information signal involves varying a parameter of a carrier wave on the basis of the information signal in such a way that the spectrum of the resulting modulated carrier is confined within the channel bandwidth. At the user location the original message signal is replicated from a version of the modulated carrier received subsequent to propagation over the channel. Such replication is generally achieved by using an inverse of the modulation process employed by the source transmitter.

Modulation also facilitates multiplexing, i.e., the simultaneous transmission of several signals over a common channel. Multiplexed communication systems will generally include a plurality of remote subscriber units requiring intermittent service of relatively short duration rather than continuous access to the communication channel. Systems designed to enable communication over brief periods of time with a set of subscriber units have been termed multiple access communication systems.

A particular type of multiple access communication system is known as a spread spectrum system. In spread spectrum systems, the modulation technique utilized results in a spreading of the transmitted signal over a wide frequency band within the communication channel. One type of multiple access spread spectrum system is a code division multiple access (CDMA) modulation system. Other multiple access communication system techniques, such as time division multiple access (TDMA), frequency division multiple access (FDMA) and AM modulation schemes such as amplitude companded single sideband are known in the art. However, the spread spectrum modulation technique of CDMA has significant advantages over these modulation techniques for multiple access communication systems. The use of CDMA techniques in a multiple access communication system is disclosed in U.S. Pat. No. 4,901,307, issued Feb. 13, 1990, entitled "*Spread Spectrum Multiple Access Communication System Using Satellite or Terrestrial Repeaters*", assigned to the assignee of the present invention.

In the above-referenced U.S. Pat. No. 4,901,307, a multiple access technique is disclosed where a large number of mobile system users, each having a transceiver, communicate through satellite repeaters or terrestrial base stations using CDMA spread spectrum communication signals. In using CDMA communications, the frequency spectrum can be reused multiple times thus permitting an increase in system user capacity. The use of CDMA results in a much higher spectral efficiency than can be achieved using other multiple access techniques.

In particular, cellular CDMA systems communication between a base station and subscriber units within the surrounding cell region is achieved by spreading each transmitted signal over the available channel bandwidth by using a unique user spreading code. In such CDMA systems the code sequences used for spreading the spectrum are constructed from two different types of sequences, each with different properties, to provide different functions. There is an outer code that is shared by all signals in a cell or sector that is used to discriminate between multipath signals. In addition, adjusting the phase of the outer code allows it to be used to discriminate between sets of users grouped into "sectors" within a given cell. For example, the users within a given cell may be partitioned into three sectors by providing three phases of the outer code. There is also an inner code that is used to discriminate between user signals transmitted over a plurality of "traffic channels" associated with each user sector. Specific transmitted signals are extracted from the communication channel by despreading the composite signal energy in the communication channel with the inner code associated with the transmitted signal to be extracted.

Referring to FIG. 1A, there is shown a first exemplary cell 10 in which are disposed a plurality of subscriber units 12 and a base station 14. As is indicated by FIG. 1A, the cell 10 is partitioned into six coverage areas C1-C6. The base station 14 may include a set of six fixed-beam antennas (not shown) dedicated to facilitating communication with subscriber units in the coverage areas C1-C6, respectively. The subscriber units 12 are grouped into a plurality of user sectors, each of which supports an equivalent number of traffic channels. As is indicated by FIG. 1A, a first residential user sector encompasses the coverage areas C1 and C6; while a second residential user sector spans the coverage area C4. Similarly, a user sector including primarily rural areas is associated with the coverage areas C2 and C3, while business users are concentrated within the coverage area C5.

As is indicated by FIG. 1A, it is necessary that certain user sectors be relatively narrow in order to accommodate demand during peak periods of system utilization. For example, the relatively narrow breadth of the business user sector is necessitated by the high concentration of business users within coverage area C5 desiring to communicate during working hours, e.g., between 8 a.m. and 5 p.m. That is, if the scope of the business user sector were expanded to include regions other than coverage area C5 it is possible that an insufficient number of traffic channels would be available during business hours to accommodate all those desiring to place calls. In contrast, the diffuse concentration of subscriber units 12 among rural dwellings allows the traffic channels associated with the rural user sector to be allocated among users distributed over two coverage areas C2-C3.

Unfortunately, during non-working hours a number of the traffic channels dedicated to the business user sector will likely go unused, since at such times there exist significantly fewer business callers and a correspondingly larger number of residential callers. Accordingly, it would be desirable to be able to provide a high concentration of traffic channels to business users within coverage area C5 during business hours, and to provide a relatively lower traffic channel concentration during non-working hours.

Although there exist antenna arrays capable of adaptively shaping a projected beam in response to changing user demand, implementation of such antenna arrays within the system of FIG. 1A would require corresponding modification of the fixed-beam architecture of the base station 14. In addition, the relatively sophisticated RF/microwave circuits typically employed in adaptive beam-forming networks result in increased system cost and complexity. Accordingly, it is an object of the invention to provide a cost-effective technique for varying the concentration of traffic channels in response to changes in the distribution of users within a spread spectrum cellular communication system.

In the specific instance of a CDMA communication system, each user sector is capable of supporting a given level of traffic demand. Accordingly, it is a further object of the invention to tailor the size of specific user sectors within a CDMA communication to the traffic channel demand within the sector. Such efficient traffic channel allocation would enable optimum utilization of communication system resources, thereby minimizing the cost per user.

In addition to addressing the need for flexible traffic channel allocation as a consequence of the short-term changes in user demand described above, it is a further object of the invention to accommodate long-term changes in user demand. Such long-term variation in demand could arise from, for example, shifts in population distribution and building patterns within a given geographic area.

A further disadvantage of conventional fixed-beam systems, such as the system of FIG. 1A, is that relatively accurate estimates of user demand must typically be available prior to system installation. That is, system designers generally must be supplied with detailed information related to expected demand patterns in order that the fixed-beam base station be configured to provide the requisite traffic channel capacity to each user sector. Changes in usage patterns occurring proximate the installation period thus tend to prevent optimal utilization of the available traffic channels. It is therefore yet another object of the present invention to provide a communication system capable of being tailored, upon installation, in accordance with existing patterns of traffic channel demand.

SUMMARY OF THE INVENTION

The present invention provides a system and method for dynamically varying traffic channel sectorization within a spread spectrum communication system.

In a preferred embodiment, the system of the invention is operative to convey information to at least one specified user in a spread spectrum communication system. The system includes a first network for generating, at a predetermined chip rate, a first pseudorandom noise (PN) signal of a first predetermined PN code. The first PN signal is then combined with a first information signal in order to provide a resultant first modulation signal. The system further includes a second network for providing a second modulation signal by delaying the first modulation signal by a predetermined delay inversely related to the PN chip rate. A switching transmission network is disposed to selectively transmit the first and second modulation signals respectively to first and second coverage areas. In this way selective transmission of the first and second modulation signals may be used to vary the size of the first user sector during different system operating periods. The first user sector is associated with a first set of traffic channels, one of which is allocated to the specified user.

BRIEF DESCRIPTION OF THE DRAWINGS

Additional objects and features of the invention will be more readily apparent from the following detailed description and appended claims when taken in conjunction with the drawings, in which:

DESCRIPTION OF THE PREFERRED EMBODIMENT

I. Introduction

Figure 1A:
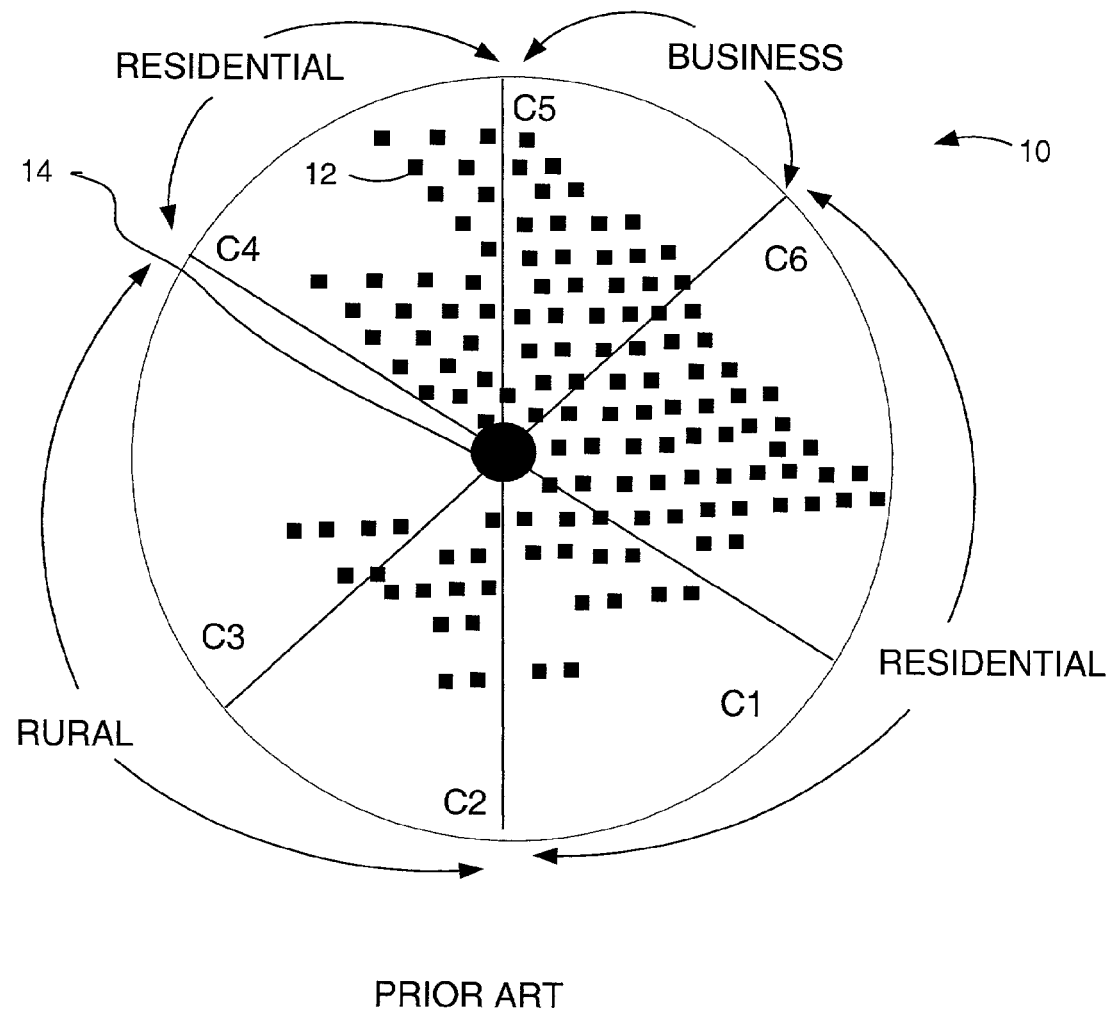
FIG. 1A shows an exemplary cell, included within a cellular communication system, in which is disposed a plurality of subscriber units and a base station.
Figure 1B:
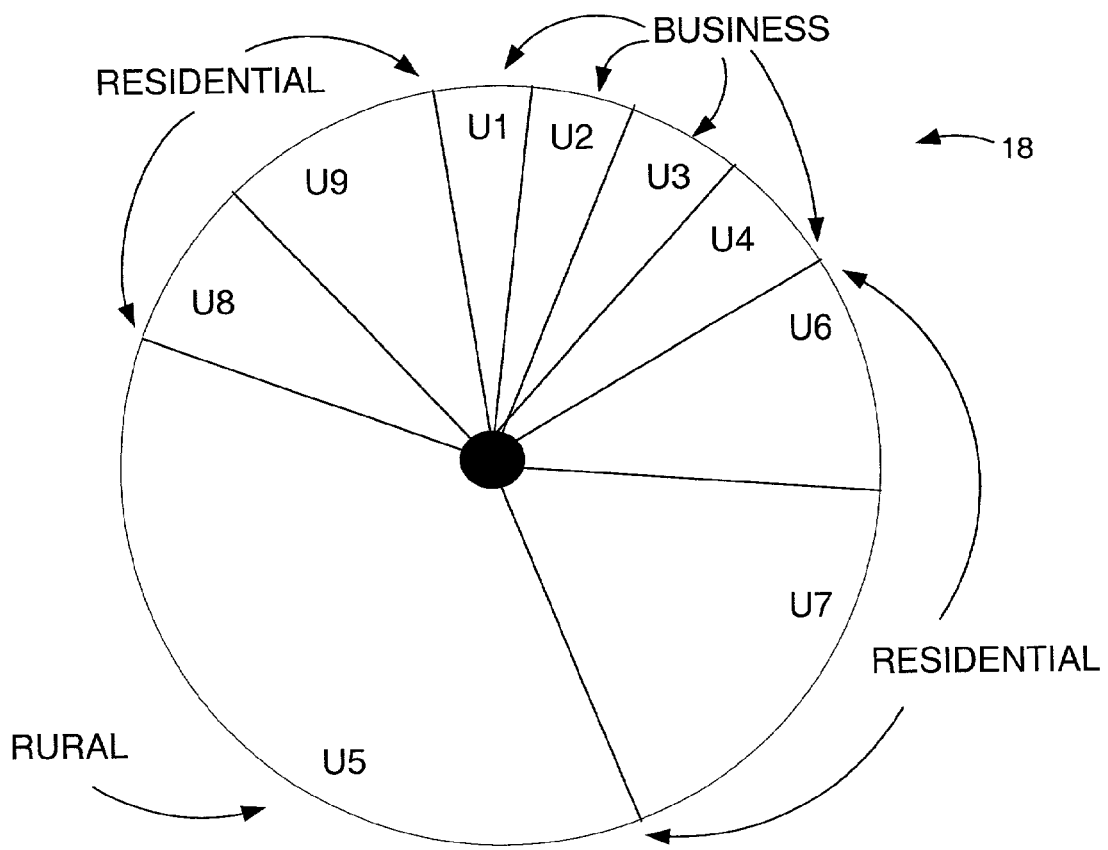
FIG. 1B shows a second exemplary cell as sectorized in accordance with the invention during normal business hours.

Turning now to FIG. 1B, there is shown a second exemplary cell 18 as sectorized in accordance with the invention during normal business hours. As is indicated by FIG. 1B, the second cell 18 is sectorized into a set of nine user sectors U1-U9. The second cell 18 is partitioned during business hours such that a set of four user sectors U1-U4, each spanning an angle of, for example, 20 degrees, are allocated to a densely populated business center. During business hours the less populated rural and residential areas of the cell are serviced by a set of relatively broader user sectors U5 and U6-U9, respectively. In an exemplary embodiment the angular width of the rural user sector U5 is set at 100 degrees, the residential user sectors U6, U8 and U9 are each of 40 degrees, and the residential user sector U7 is of 60 degrees. The narrow breadth of the user sectors U1-U4 is necessitated by the high concentration of users within the business center desiring to communicate during working hours. In this way the confined scope of the user sectors U1-U4 ensures that a sufficient number of traffic channels are available during working hours to accommodate a desired number of users within the business center.

Figure 1C:
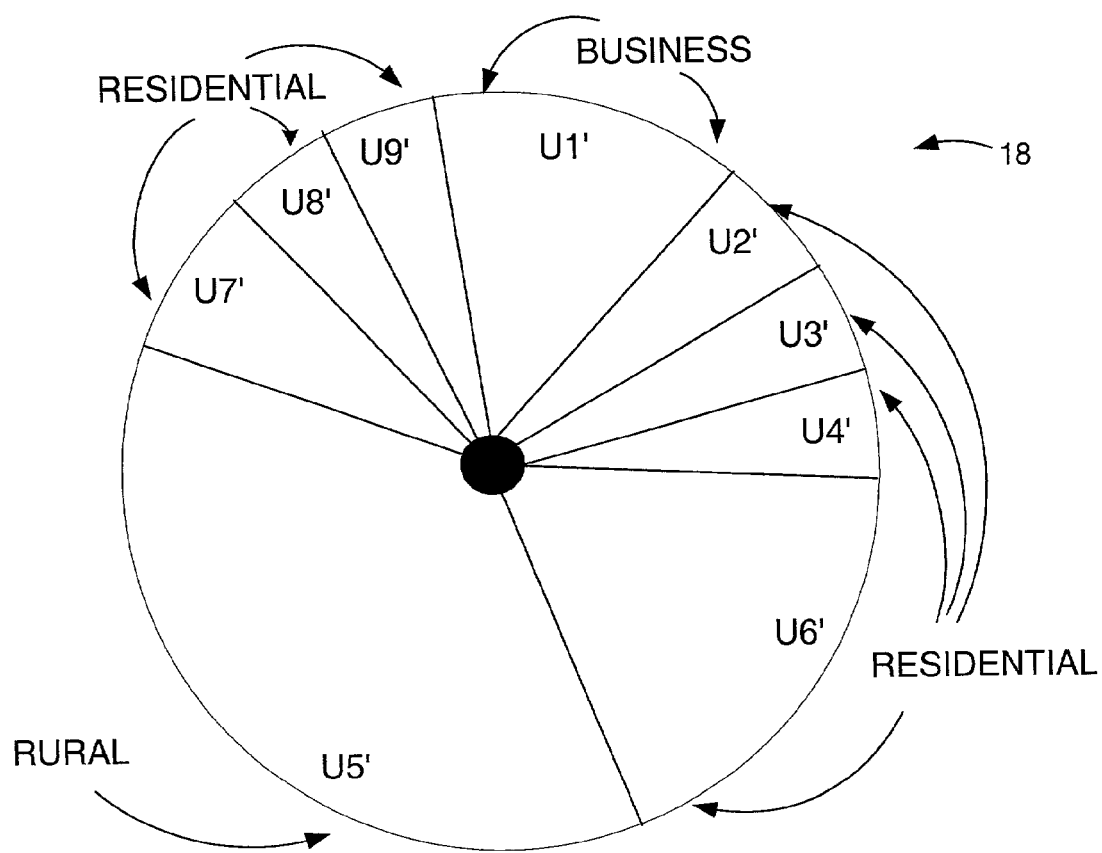
FIG. 1C depicts the second exemplary cell as sectorized during evening hours in accordance with the invention.

FIG. 1C depicts the second exemplary cell 18 as sectorized during evening (i.e., non-working) hours into a plurality of nine user sectors U1'-U9' in accordance with the invention. As is indicated by FIG. 1C, during non-working hours a single user sector U1' of 80 degrees, rather than the four 20-degree sectors U1-U4 required during working hours, is employed to service demand within the business center. Similarly, the population shift to residential areas during the evening hours requires the increased sectorization provided by the seven user sectors U2'-U6', and U7'-U9', relative to the four sectors U6-U9 required during the daytime. In the exemplary embodiment the angular width of residential user sectors U2'-U4' and U8'-U9' is set at 20 degrees, and the angular width of the residential user sectors U6' and U7' is set at 40 degrees. The rural user sector U5' remains at 100 degrees during both day and evening hours as a consequence of the typically minimal temporal variation in user demand throughout rural regions. The change in sectorization illustrated by FIGS. 1B-1C may be achieved using the dynamic sectorization system of the invention, the operation of which is described below with reference to the block diagram of FIG. 1D.

Figure 1D:
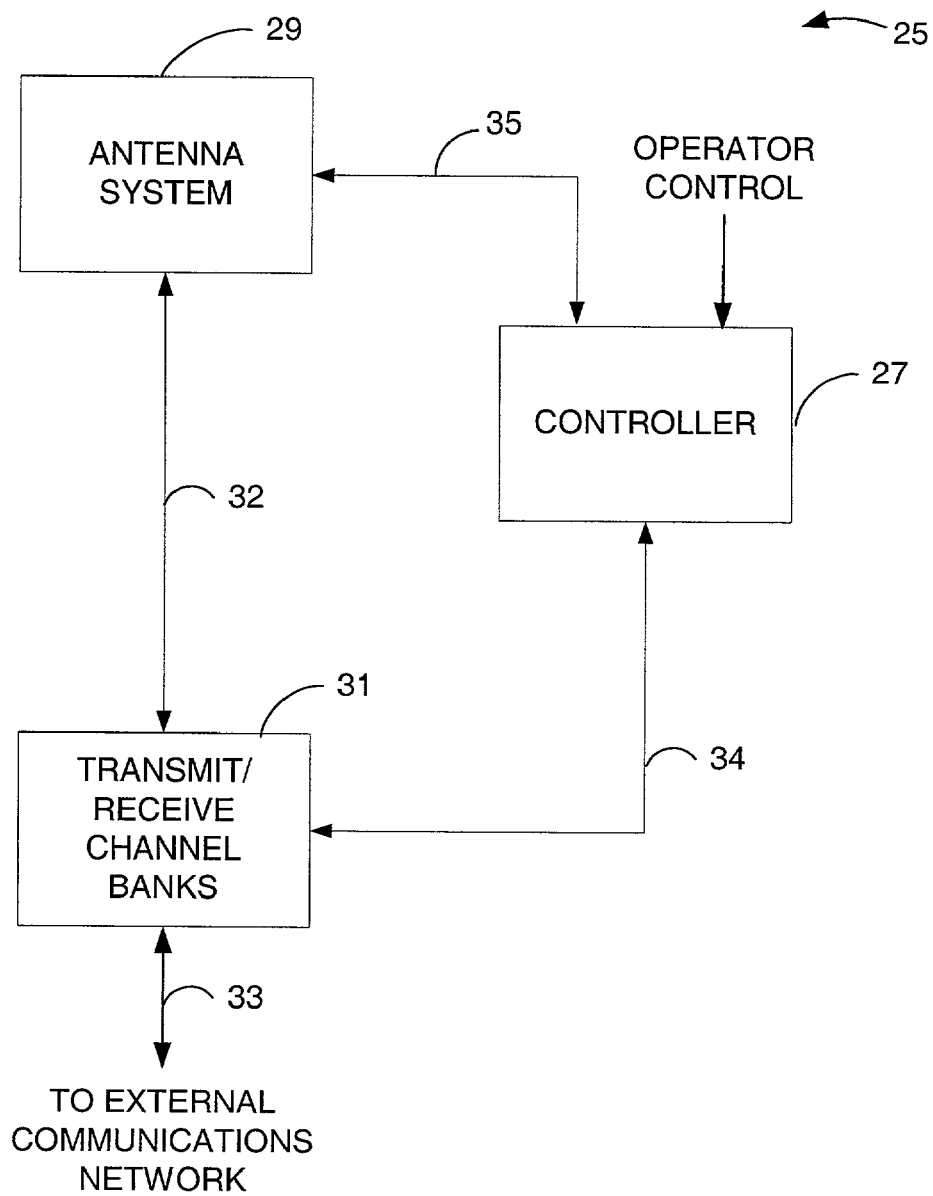
FIG. 1D shows a block diagram representation of an exemplary base station communications transceiver in which the dynamic sectorization system of the invention is embodied.

FIG. 1D shows a block diagram representation of an exemplary base station communications transceiver 25 in which the dynamic sectorization system of the invention is embodied. As is discussed below, the transceiver 25 operates to provide improved service to users disposed within a first cell of a cellular communications system by dynamically varying the allocation of traffic channels among various user sectors within the cell. The transceiver 25 is seen to include a controller 27, an antenna system 29 and transmit/receive channel banks 31. Controller 27 is typically programmed to provide channel set-up/assignment of the transmit/receive channel banks 31. The transmit/receive channel banks 31 are electromagnetically coupled to the antenna system 29 via a waveguide transmission line 32 or the like. Each individual channel bank may comprise, for example, a plurality of channel units capable of facilitating communication with a particular user. In the embodiment of FIG. 1D, the transmit/receive channel banks 31 supply beam-forming signals to the antenna system 29 so as to sectorize the first cell into a plurality of user sectors, each of which has associated therewith a plurality of user traffic channels. Information signals are relayed between the channel banks 31 and an external communications network, e.g., a public switched telephone network (PSTN), over a data bus 33.

In a first preferred embodiment of the invention, a fixed number of traffic channels are associated with each user sector. Under this constraint the present invention contemplates accommodating variations in user demand within the various regions of the cell by adjusting the relative size of each user sector. For example, a number of relatively narrow user sectors could be employed to service the users within a particular area of the cell during periods of high user demand. This maximizes the likelihood that a traffic channel will be available to all those desiring to establish communication during such periods of heightened demand. Conversely, during periods of minimum demand a relatively fewer number of user sectors of wider width could be utilized to provide the requisite traffic channel capacity. Such widening of the user sectors associated with a particular cell area during periods of reduced demand allows for efficient use of the fixed number of traffic channels assigned to each user sector. That is, by increasing the geographic extent of user sectors during periods of minimal demand, the number of likely system users included within each user sector can be held relatively constant. This prevents excess traffic channel capacity from developing in user sectors directed to a given geographic area in the event of decreases in user concentration, i.e., demand, within the given area.

It is to be understood, however, that in alternate embodiments of the present invention, the number of traffic channels allocated to a particular user sector may be varied in response to changing demand conditions. In addition, the present invention may enable even further improvement in traffic channel utilization by allowing for alteration of both the geographic size of, and the number of traffic channels associated with a given user sector.

In a presently preferred embodiment of the invention statistics relating to channel usage within each user sector are monitored by the associated ones of the channel banks 31 and conveyed to controller 27 by way of a first control bus 34. Control information from the controller 27 respectively received by the channel banks 31 and the antenna system 29 over the first control bus 34, and a second control bus 35, respectively, allows traffic channels to be allocated to user sectors on the basis of the usage statistics supplied by the channel banks 31. That is, the beam pattern projected by antenna system 29 is adjusted in order that a selected set of traffic channels are provided to each user sector. In the presently preferred embodiment, the monitored channel usage is displayed to an operator (not shown) by controller 27, thus allowing specification of the desired cell sectorization. In an automated mode, controller 27 is programmed to assign channels and/or sector size based upon channel usage statistics.

In other embodiments of the invention the controller 27 may be configured to monitor channel usage by virtue of information received from the channel banks 31 over the first control bus 34. The pertinent channel usage information could again be displayed to an operator in order to enable appropriate adjustment of the size of each user sector. Alternately, the controller 27 could be programmed to automatically provide channel setup/assignment commands to the channel banks 31 on the basis of the monitored channel usage, again obviating the need for control information to be supplied by an operator.

Although in the presently preferred embodiments of the invention the size of each user sector is adjusted through alteration of the beam pattern projected by the antenna system 29, in other implementations an equivalent modification of sector size could be achieved through processing of the beam-forming signals supplied by the channel banks 31. In such implementations, the beam-forming signals processed by the channel banks 31 would be weighted and combined prior to being provided to, or received from, the antenna system 29. In this way dynamic sectorization could be achieved by providing control information to signal processing electronics (not shown) coupled to the channel banks 31, rather than by supplying such information to the antenna system 29.

Referring again to FIG. 1D, it would appear that one way of accommodating variation in user demand would be to configure the base station antenna system 29 to provide a plurality of fixed antenna beams using an associated set of fixed-beam antenna elements. In such an arrangement each base station antenna would project a beam of fixed width over one of a set of adjacent coverage areas. Differing numbers of the coverage areas would then be assigned to each user sector on the basis of expected usage requirements. In this way changes in user concentration could be addressed by dynamically varying the number of fixed antenna beams used to carry the traffic channels associated with a given sector.

One difficulty presented by such an approach is that significant distortion in beam pattern could be expected to arise proximate the boundaries between coverage areas included within a given user sector. As was discussed in the Background of the Invention, in certain cellular communication systems a long PN code of predetermined phase is used to modulate the information signals carried by the traffic channels of a given user sector. If such information signals modulated with the long PN code of the given user sector were then projected by a pair of fixed-beam antennas into adjacent coverage areas, an arbitrary phase difference would exist between the identical PN-modulated signals carried by each beam. Such phase difference could be engendered by, for example, variation in the lengths of the signal paths from the beam-forming network of the base station to each fixed-beam antenna. Since these PN-modulated signals are not aligned in phase at the boundary of the beam coverage area, the resulting coherent interference would tend to distort the beam pattern by producing nulls and other irregularities. The resultant signal fading accompanying such pattern distortion would then degrade the signal-to-noise-ratio of the PN-modulated signal received by any proximately located subscriber unit receivers.

II. Dynamic Sectorization Using Transmit Antenna Array

As is described hereinafter, in a preferred embodiment the present invention contemplates using an arrangement of fixed-beam antennas to dynamically vary the area encompassed by each user sector. As employed herein, the term "dynamic user sectorization" is intended to be descriptive of the process of varying the size of a set of user sectors between successive system operating periods. In accordance with the invention, a delay is introduced between each pair of identical PN-modulated signals projected to adjacent coverage areas within a given user sector, thereby decorrelating each such pair of signals. In the preferred embodiment a delay having a duration slightly longer than the period of a chip of the PN long code is used to decorrelate the signals projected to adjacent coverage areas within each user sector. A subscriber unit positioned at a coverage area boundary is thus able to discriminate between, and hence to separately receive, the decorrelated PN-modulated signals provided to the adjacent coverage areas. The separately received signals are then time-aligned within the receiver using conventional techniques of diversity reception, and are despread using a locally-generated replica of the long PN code.

Applying the technique of the invention to the system of FIG. 1A, delays would be introduced at least between the signals projected to coverage areas C1 and C6 of the first residential user sector, and between the signal pairs provided to coverage areas C2 and C3 of the rural user sector. Although in a preferred embodiment delays are also introduced between the signal pairs projected to adjacent coverage areas within different user sectors (e.g., between the signal pair provided to coverage areas C3 and C4), such signal pairs are assumed to be independently decorrelated as a consequence of the differing PN long code phase associated with each user sector.

Figure 2:
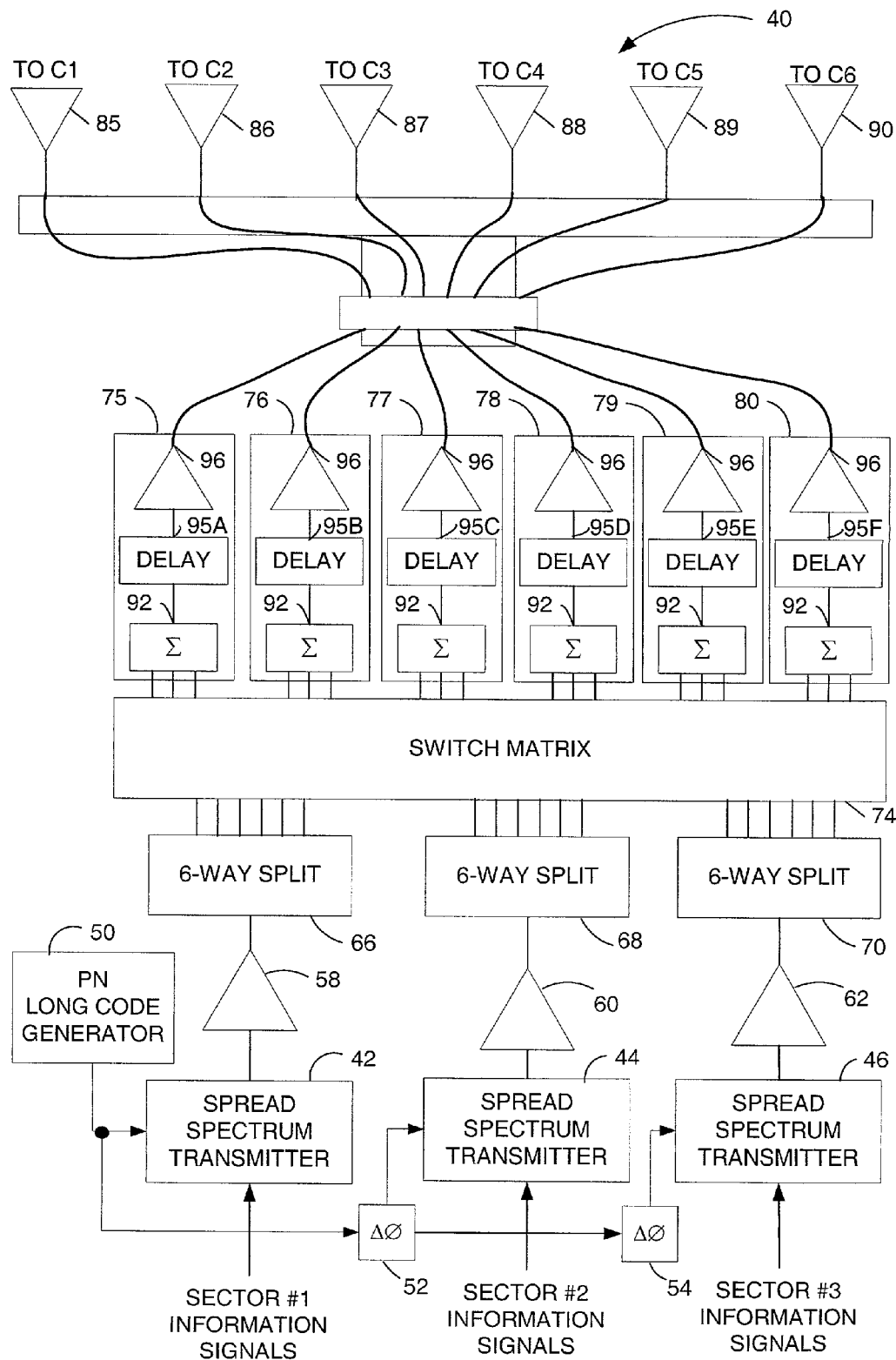
FIG. 2 provides a block diagrammatic representation of a base station transmitter network configured to provide dynamic user sectorization in accordance with the invention.

Referring to FIG. 2, there is shown a block diagrammatic representation of a base station transmitter network 40 configured to provide dynamic user sectorization in accordance with the invention. The network 40 is seen to include first, second and third spread spectrum transmitters 42, 44, and 46 for processing baseband information signals to be transmitted over traffic channels associated with first (#1), second (#2) and third (#3) user sectors. A PN long code generator 50 provides the long PN code used by the transmitters 42, 44 and 46 in modulating the information signals transmitted to each user sector. The relative phases of the PN long codes supplied to the transmitters 42, 44 and 46 are offset by predetermined margins by phase delay elements 52 and 54. In the preferred embodiment, the phase delay elements 52 and 54 provide delays approximately equivalent in duration to 768 PN chips. Within the transmitters 42, 44 and 46 the PN-modulated information signals are used to bi-phase modulate a quadrature pair of sinusoids. The modulated sinusoids are then summed, bandpass filtered, shifted to an RF carrier frequency, and provided to transmit amplifiers 58, 60 and 62. The amplified signals produced by the amplifiers 58, 60 and 62 comprise the PN-modulated information signals to be provided via an RF carrier to user sectors #1, #2, and #3, respectively. The outputs of each of the amplifiers 58, 60 and 62 are respectively connected to six-way splitter networks 66, 68 and 70. As is indicated by FIG. 2, the splitter networks 66, 68 and 70 are coupled to a switch matrix 74.

As is described in further detail with reference to FIG. 3, the switch matrix 74 provides a switchable connection between the information signal associated with each user sector and a set of six antenna drivers 75-80. That is, the switch matrix 74 allows the information signals from any user sector to be routed to users within any of the coverage areas C1-C6. The antenna drivers 75-80 are associated with a set of six base station antennas 85-90, each antenna 85-90 being operative to project a beam over one of the coverage areas C1-C6 (FIG. 1A). Each antenna driver 75-80 is further seen to include an input summation node 92. The summation nodes 92 are each coupled to switch matrix 74 through a set of three input signal lines, each signal line carrying the PN-modulated information signals corresponding to either user sector #1, #2 or #3.

As noted above, in a preferred embodiment, delays are introduced between the signals projected to any pair of adjacent coverage areas. Accordingly, the antenna drivers 75-80 are seen to include delay elements 95A-95F capable of providing delays slightly longer than the chip period of the PN code provided by PN long code generator 50. In a preferred embodiment alternate ones of the delay elements 95A-95F (e.g., elements 95B, 95D, and 95F) are designed to provide a delay slightly longer than a single PN chip period, while the remaining delay elements (e.g., elements 95A, 95C, and 95E) are omitted (zero delay). The delay elements 95A-95F could be realized using one or more surface acoustic wave (SAW) filters. Alternately, a coiled optical fiber of predetermined length could be used to create the desired delay. Each antenna driver 75-80 also includes a power amplifier 96 for providing an output signal to one of the antennas 85-90.

Figure 3:
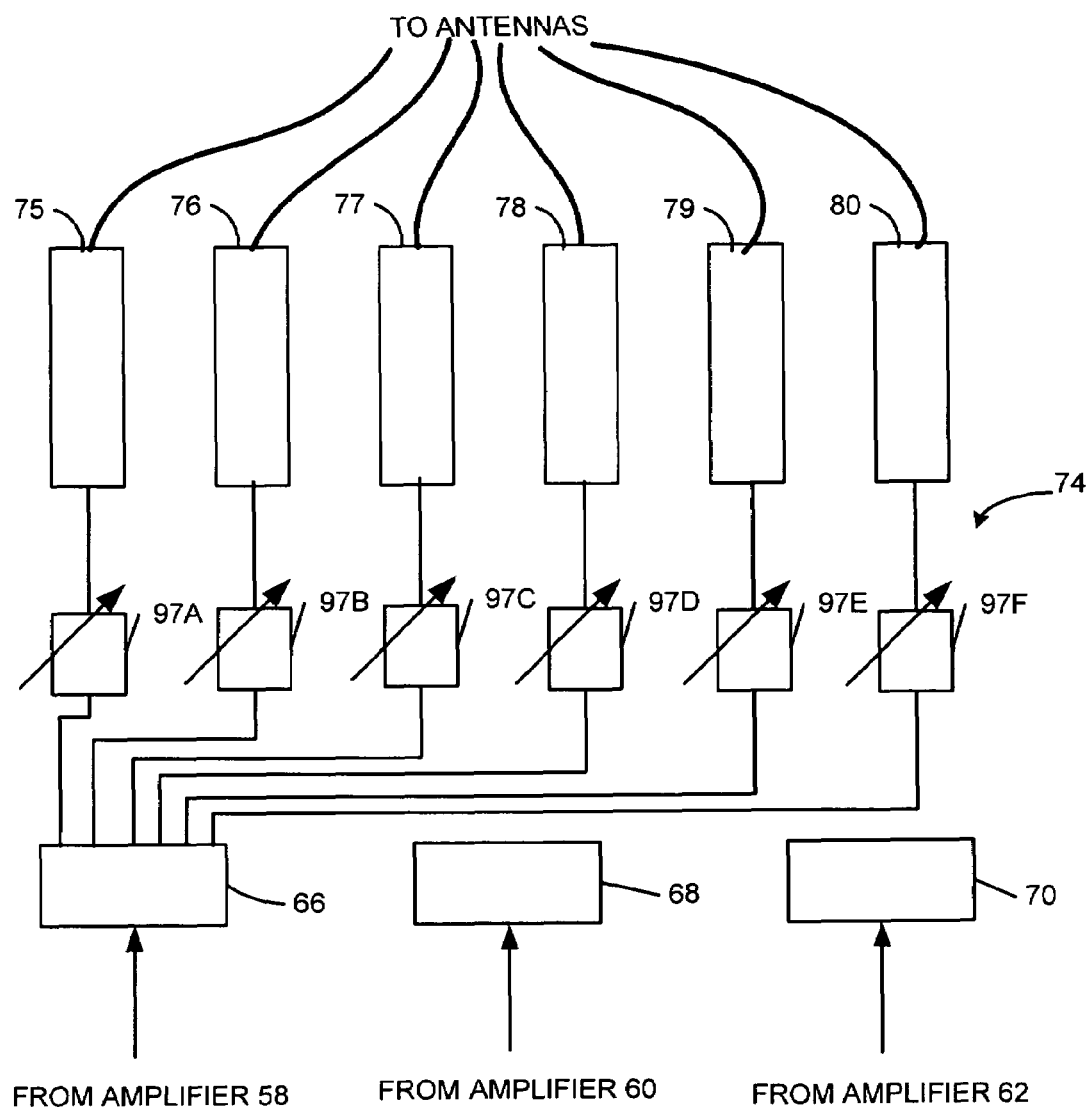
FIG. 3 depicts a switch matrix, disposed within the base station transmitter, for providing a switchable connection between the information signal associated with each user sector and a set of six antenna drivers.

Referring to FIG. 3, there is shown an illustrative representation of that portion of the switch matrix 74 operative to switchably connect the six-way splitter 66 to each of the antenna drivers 75-80. In particular, digitally-controlled attenuators 97A-97F are interposed between the outputs of the splitter 66 and the antenna drivers 75-80. If, for example, it was desired that the first user sector encompass coverage areas C2-C4, then attenuators 97A, 97E and 97F would be set to maximum attenuation, while the attenuators 97B-97D would be turned off (i.e., set to provide zero attenuation). In a preferred embodiment the switch matrix 74 includes two other sets of six digital attenuators (not shown), substantially identical to the attenuators 97A-97F, for switchably connecting the splitters 68 and 70 to the antenna drivers 75-80.

The attenuators 97A-97F will preferably have a dynamic range of approximately 30 dB, and should be capable of being adjusted in 1 dB increments. In this way the beam projected to a particular coverage area may be gradually extinguished, and then gradually established once again, during a transition between sector configurations. For example, if it were desired to modify the scope of the first user sector so that it included only coverage areas C3-C4 rather than C2-C4, attenuator 97B would be incrementally adjusted horn zero to maximum attenuation. Assuming it were desired to simultaneously increase the scope of the second user sector, the setting of an attenuator (not shown) connected between the second antenna driver 76 and the splitter 68 sector would contemporaneously be changed from maximum to zero attenuation. The digital attenuators 97A-97F are of a type available from, for example, ANZAC CORP, such as Part No AT-210.

Although in the implementation of FIG. 3, the switch matrix 74 is configured to allow any user sector to encompass any combination of coverage areas C1-C6, it is understood that in alternate embodiments the matrix 74 could be simplified by limiting the potential scope to three or four coverage areas.

Referring to FIGS. 1A and 2, each of the antennas 85-90 is designed to project a 60 degree beam to one of the six coverage areas C1-C6. It is understood, however, that increased sectorization could be achieved by utilizing nine antennas, each of which would be designed to project a 40 degree beam. In addition, dual-mode antennas capable of providing both horizontally and vertically polarized beams could be employed to accommodate up to twice as many users within each coverage area. As is described below with reference to FIG. 4, separate antenna drivers are used to generate the signals projected by each horizontally and vertically polarized beam.

Figure 4:
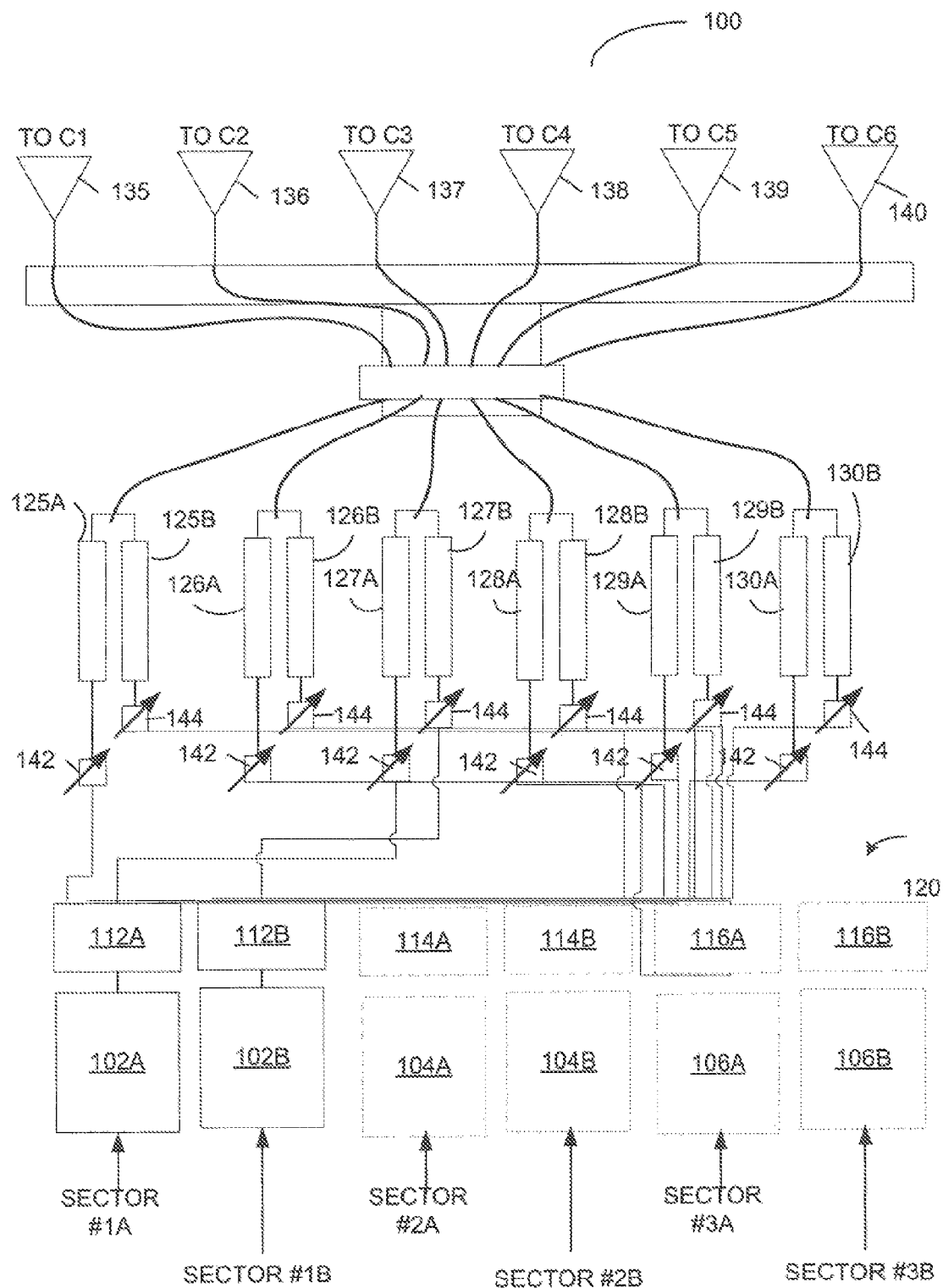
FIG. 4 depicts a block diagram of a base station transmitter network capable of providing increased user sectorization by utilizing both horizontally and vertically polarized antenna beams.

Referring to FIG. 4, there is shown a block diagram of a base station transmitter network 100 disposed to provide increased user sectorization by employing both horizontally and vertically polarized antenna beams. The network 100 is seen to include first, second and third pairs of spread spectrum transmitters 102A-102B, 104A-104B, and 106A-106B, for processing baseband information signals to be transmitted over first (#1A-1B), second (#2A-2B) and third (#3A-3B) paired sets of traffic channels associated with a corresponding set of three user sectors. As is described below, the sets of traffic channels #1A, #2A and #3A may be selectively projected to each coverage area using horizontally-polarized beams, while the traffic channels #1B, #2B and #3B may be similarly selectively projected using vertically-polarized beams. A PN long code generator (not shown) provides the long PN code used by the transmitters 102A-102B, 104A-104B, and 106A-106B in modulating the information signals transmitted to each user sector. Again, the relative phases of the PN long codes supplied to the transmitters 102A-102B, 104A-104B, and 106A-106B are offset by phase margins equivalent to a predetermined number of PN chips.

Within the transmitters 102A-102B, 104A-104B, and 106A-106B the PN-modulated information signals are used to bi-phase modulate a quadrature pair of sinusoids. The modulated sinusoids are then summed, bandpass filtered, shifted to an RF carrier frequency, and amplified. The outputs of each of the transmitters 102A-102B, 104A-104B, and 106A-106B are respectively connected to six-way splitter networks 112A-112B, 114A-114B, and 116A-116B. As is indicated by FIG. 4, the splitter networks 112A-112B, 114A-114B, and 116A-116B are coupled to a switch matrix 120.

The switch matrix 120 provides a switchable connection between the information signals transmitted over the paired sets of traffic channels (e.g. #1A and #1B) of each user sector and six pairs of antenna drivers 125A-125B through 130A-130B. Application of the output of each antenna driver 125A-130A to antennas 135-140 results in the projection of horizontally-polarized to beams coverage areas C1-C6, while application of the output of each antenna driver 125B-130B to antennas 135-140 results in the projection of a vertically-polarized beam to each coverage area C1-C6. As is indicated by FIG. 4, the switch matrix 120 is configured such that the two sets of users associated with each user sector may be serviced within each of the coverage areas C1-C6.

Referring to FIG. 4, there is shown an illustrative representation of that portion of the switch matrix 120 operative to switchably connect the six-way splitters 12A-112B to each of the antenna drivers 125A-125B through 130A-130B. In particular, digitally-controlled attenuators 142 and 144 are interposed between the outputs of the six-way splitters 112A-112B and each of the antenna drivers 125A-125B through 130A-130B. In a preferred embodiment the switch matrix 120 includes two other sets of twelve digital attenuators (not shown), for switchably connecting the splitters 114A-114B and 116A-116B to the antenna drivers 125A-125B through 130A-130B.

Each pair of antenna drivers (e.g., drivers 126A-125B) is connected to one of six base station antennas 135-140, each antenna 135-140 being operative to project a horizontally-polarized and a vertically-polarized beam over one of the coverage areas C1-C6 (FIG. 1A). As noted above, in a preferred embodiment delays are introduced between the signals projected to any pair of adjacent coverage areas. Accordingly, alternate pairs of antenna drivers (e.g., drivers 125A-125B, 127A-127B) are disposed to provide delays slightly longer than a single PN chip period. In other respects, the antenna drivers 125A-125B through 130A-130B are substantially similar to the antenna drivers 75-80.

Figures 5A, 5B:
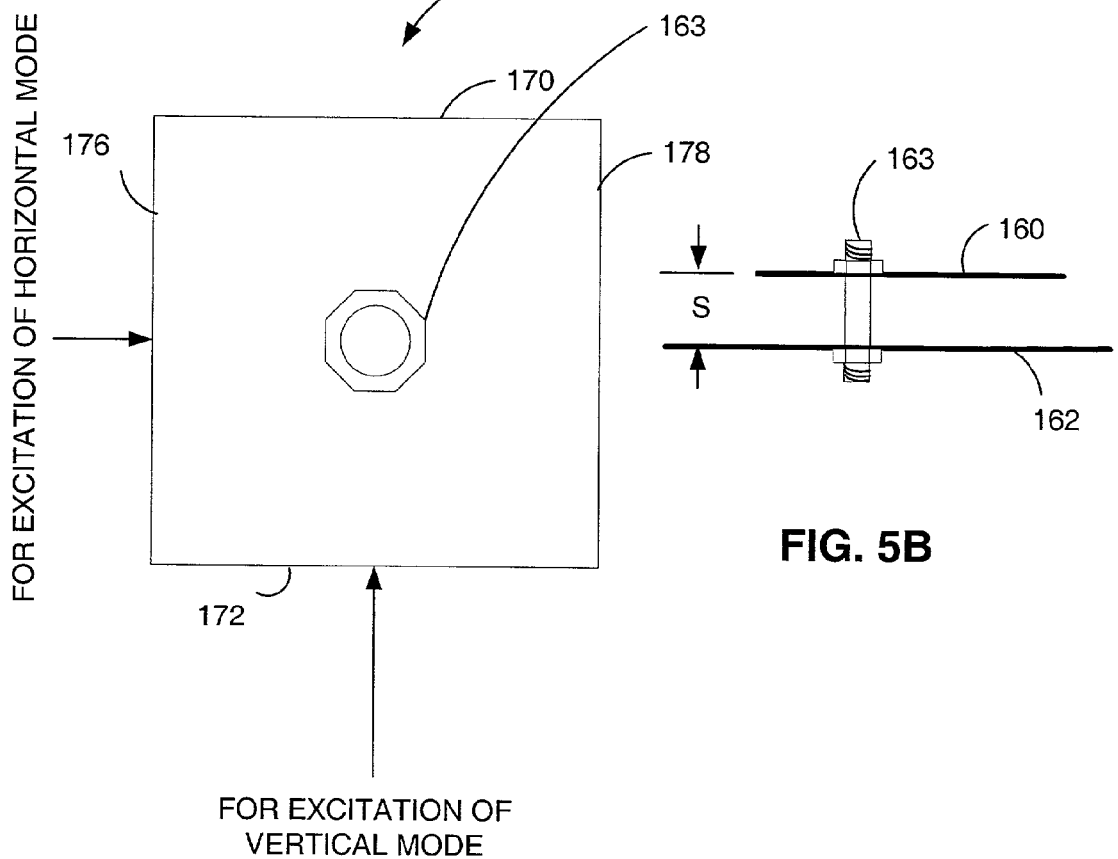
FIGS. 5A and 5B respectively provide top and side views of a dual-mode resonant patch antenna incorporated within a preferred implementation of the base station antennas.

FIGS. 5A and 5B respectively provide top and side views of a dual-mode resonant patch antenna capable of realizing the antennas 135-140. The patch element 160 shown in FIG. 5A is one-half carrier wavelength in each dimension and is suspended above a ground plane 162 (FIG. 5B) by a post 163. The patch element 160 is seen to be separated from the ground plane 162 by a separation distance S. In the preferred embodiment the distance S is selected such that sufficient bandwidth is provided to span both the transmit and receive frequency bands. The vertically-polarized mode is created by resonating the patch element 160 such that voltage maxima occur proximate upper and lower edges 170 and 172 of the patch element 160, and such that a voltage null occurs in the middle. Similarly, the horizontally-polarized mode is created by resonating the patch 160 such that voltage maxima arise at left and right edges 176 and 178 of the patch element 160. In a preferred embodiment the vertically-polarized mode is excited via a voltage probe applied to the center of the upper 170 and lower 172 edges of the patch element 160. In like manner, the horizontal mode is induced using voltage probes connected to the right and left edges 176 and 178.

III. Dynamic Sectorization within a Receive Network

Figure 6:
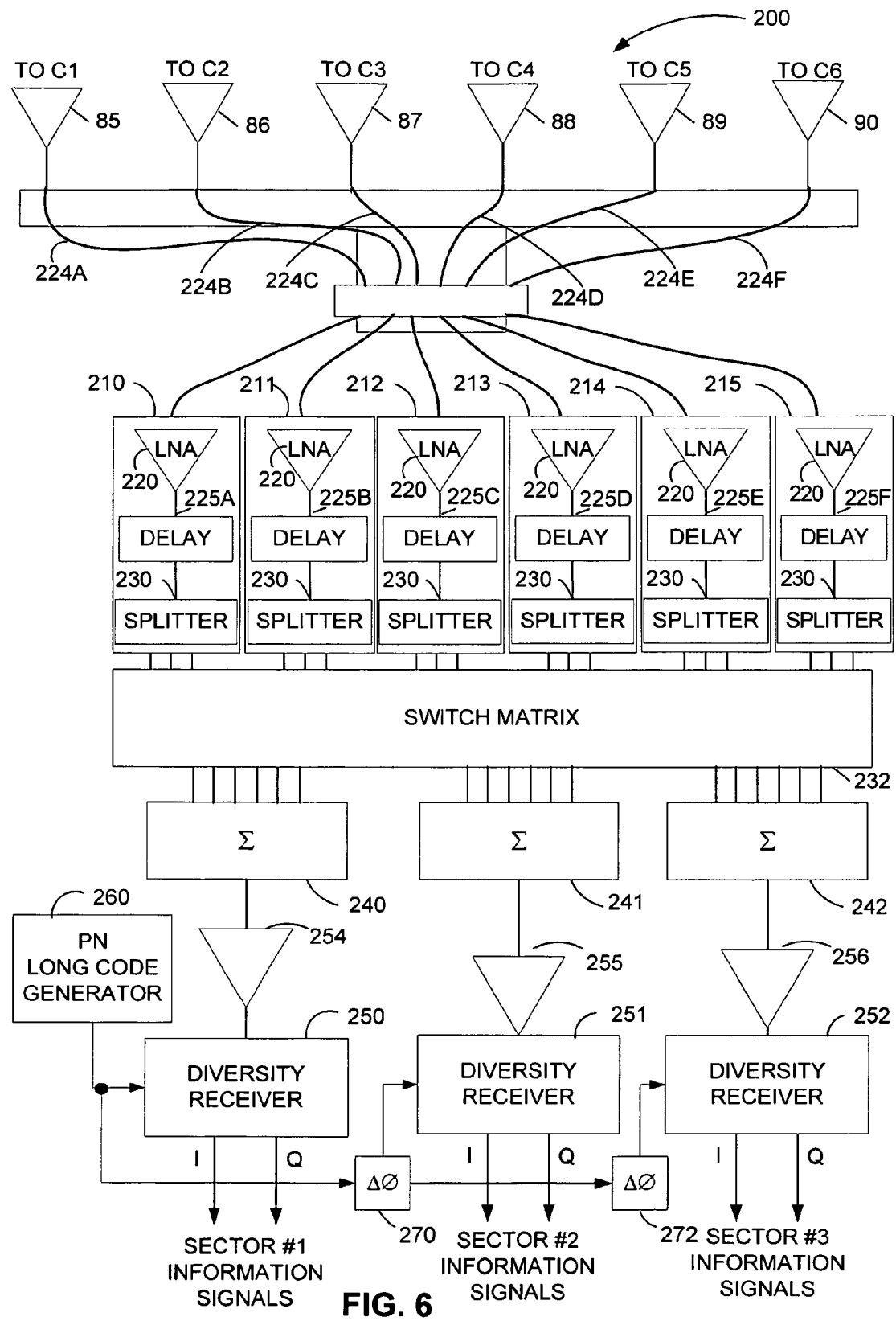
FIG. 6 shows a block diagrammatic representation of a base station receiver network configured to provide dynamic user sectorization in accordance with the invention.

Referring to FIG. 6, there is shown a block diagrammatic representation of a base station receiver network 200 configured to provide dynamic user sectorization in accordance with the invention. The network 200 is seen to be generally complementary to the transmitter network 40 (FIG. 2) in that a decorrelating delay is introduced between signals received from adjacent coverage areas. The receiver network 200 and the transmitter network 40 may be simultaneously coupled to the antennas 85-90 through a duplexer (not shown).

The signals received from the coverage areas C1-C6 through antennas 85-90 are respectively provided to receive amplifiers 210-215. The receive amplifiers 210-215 each include a low-noise amplifier (LNA) 220 having a passband centered about the frequency of the received RF carrier. The amplifiers 210-215 are further seen to include delay elements 225A-225F capable of providing delays slightly longer than the chip period of the PN long code used to discriminate between user sectors. In a preferred embodiment, alternate ones of the delay elements 225A-225F (e.g., elements 225B, 225D, and 225F) are designed to provide a delay slightly longer than a single PN chip period, while the remaining delay elements are omitted (zero delay). The delay elements 225A-225F could be realized using one or more surface acoustic wave (SAW) filters. Alternatively, a coiled optical fiber of predetermined length could be used to create the desired delay.

The output of each delay element 225A-225F is provided to a 3-way splitter 230 connected to a switch matrix 232. The switch matrix 232 is substantially identical to the switch matrix 74, and hence provides a switchable connection between each output of the 3-way splitters 230 and an input to one of three 6-way summation networks 240-242. The summation networks 240-242 are coupled to a corresponding set of three diversity receivers 250-252 through amplifiers 254-256, each diversity receiver capable of being implemented in the manner described below with reference to FIG. 10. Each diversity receiver 250-252 frequency downconverts, and digitizes the received signal into composite I and Q components. The composite I and Q components then demodulated, combined, deinterleaved and decoded.

Each I and Q component may be comprised of data signals from a given subscriber unit received by two or more of the antennas 85-90 associated with adjacent coverage areas C1-C6 of a given user sector. The received signals associated with each coverage area, as selected by a searcher receiver in combination with a controller, are each processed by a different one of multiple data receivers or demodulators, which are also referred to as "fingers" (not shown). From the composite I and Q components each finger extracts, by despreading, the I and Q components RI and RQ of the pilot and data signals associated with each coverage area. A PN long code generator 260 provides the long PN code used by the receivers 250-252 in demodulating the information signals received from each user sector. The relative phases of the PN long codes supplied to the receivers 251-252 are offset by predetermined margins by phase delay elements 270 and 272, as illustrated. In the preferred embodiment, the phase delay elements 270 and 272 provide delays approximately equivalent in duration to 768 PN chips.

IV. Dynamic Sectorization within a CDMA System

Figure 7:
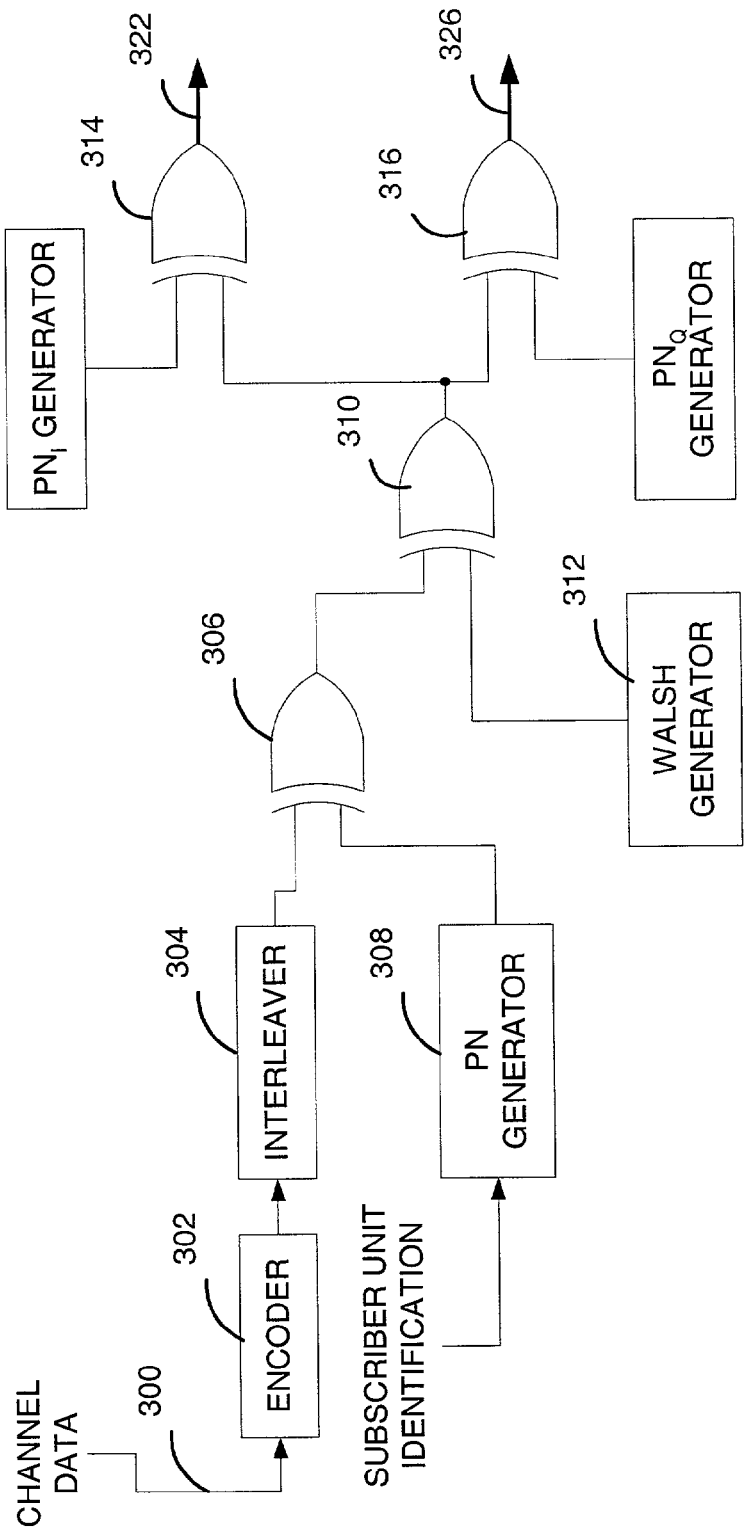
FIG. 7 provides a block diagrammatic representation of an exemplary spread spectrum transmitter.

Referring to FIG. 7, there is shown a block diagrammatic representation of a spread spectrum transmitter suitable for realizing the spread spectrum transmitters 42, 44 and 46 (FIG. 2). The spread spectrum transmitter of FIG. 7 is of the type described in U.S. Pat. No. 5,103,459, issued 1992, entitled "System and Method tar Generating Signal Waveforms in a CDMA Cellular Telephone System". which is assigned to the assignee of the present invention, and which is herein incorporated by reference. In the transmitter of FIG. 7, data bits 300 consisting of, for example, voice converted to data by a vocoder, are supplied to an encoder 302 where the bits are convolutionally encoded with code symbol repetition in accordance with the input data rate. When the data it rate is less than the bit processing rate of the encoder 302, code symbol repetition dictates that encoder 302 repeats the input data bits 300 in order to create a repetitive data stream at a bit rate which matches the operative rate of encoder 302. The encoded data is then provided to interleaver 304 where it is interleaved. The interleaved symbol data is output from interleaver 304 at an exemplary rate of 19.2 ksps to in input of exclusive-OR 306.

In the system of FIG. 7, the interleaved data symbols are scrambled to provide greater security in transmissions over the channel. Scrambling of the voice channel signals may be accomplished by pseudonoise (PN) coding the interleaved data with a PN code specific to an intended recipient subscriber unit. These scrambling codes comprise the "inner" PN codes to which reference was made in the Background of the Invention. Such PN scrambling may be provided by the PN generator 308 using a suitable PN sequence or encryption scheme. The PN generator 308 will typically include a long PN generator for producing a unique PN code at a fixed rate of 1.2288 MHz. This PN code is then passed through a decimator (not shown), with the resulting 19.2 MHz scrambling sequence being supplied to the other input of exclusive-OR 306 in accordance with subscriber unit identification information provided thereto. The output of exclusive-OR 306 is then provided to one input of exclusive-OR 310.

Again referring to FIG. 7, the other input of exclusive-OR gate 310 is connected to a Walsh code generator 312. Walsh generator 312 generates a signal corresponding to the Walsh sequence assigned to the data channel over which information is being transmitted. The Walsh code provided by generator 312 is selected from a set of 64 Walsh codes of length 64 The 64 orthogonal codes correspond to Walsh codes from a 64 by 64 Hadamard matrix, wherein a Walsh code is a single row or column of the matrix. The scrambled symbol data and Walsh code are exclusive-OR'ed by exclusive-OR gate 310 with the result provided as an input to both of the exclusive-OR gates 314 and 316.

Exclusive-OR gate 314 also receives a $PN_I$ signal, while the other input of exclusive-OR gate 316 receives a $PN_Q$ signal. In CDMA applications the PN long code generator 50 (FIG. 2) operates to provide both $PN_I$ and $PN_Q$ sequences to the spread spectrum transmitters 42, 44 and 46. The $PN_I$ and $PN_Q$ signals are pseudorandom (PN) signals corresponding to a particular user sector covered by the CDMA system and relate respectively to in-phase (I) and quadrature phase (Q)

communication channels. The $PN_I$ and $PN_Q$ signals are respectively exclusive-OR'ed with the output of exclusive-OR gate 310 so as to further spread the user data prior to transmission. The resulting I-channel code spread sequence 322 and Q-channel code spread sequence 326 are used to bi-phase modulate a quadrature pair of sinusoids. Each quadrature pair of sinusoids is summed within transmitters 42, 44 and 46, is shifted to an RF frequency, and is provided to one of the amplifiers 58, 60 and 62.

In the preferred embodiment, a pilot channel containing no data modulation is transmitted together with the I-channel and Q-channel spread sequences $S_I$ and $S_Q$. The pilot channel may be characterized as an unmodulated spread spectrum signal used for signal acquisition and tracking purposes. In systems incorporating a plurality of base station transmitters in adjacent cells, the set of communication channels provided by each will be identified by a unique pilot signal. However, rather than using a separate set of PN generators for the pilot signals, it is realized that a more efficient approach to generating a set of pilot signals is to use shifts in the same basic sequence. Utilizing this technique an intended receiver unit sequentially searches the whole pilot sequence and tunes to the offset or shift that produces the strongest correlation.

Accordingly, the pilot sequence will preferably be long enough that many different sequences can be generated by shifts in the basic sequence to support a large number of pilot signals in the system. In addition, the separation or shifts must be great enough to ensure that there is no interference in the pilot signals. Hence, in an exemplary embodiment the pilot sequence length is chosen to be $2^{15}$, which allows for 512 distinct pilot signals with offsets in a basic sequence of 64 chips.

Figure 8:
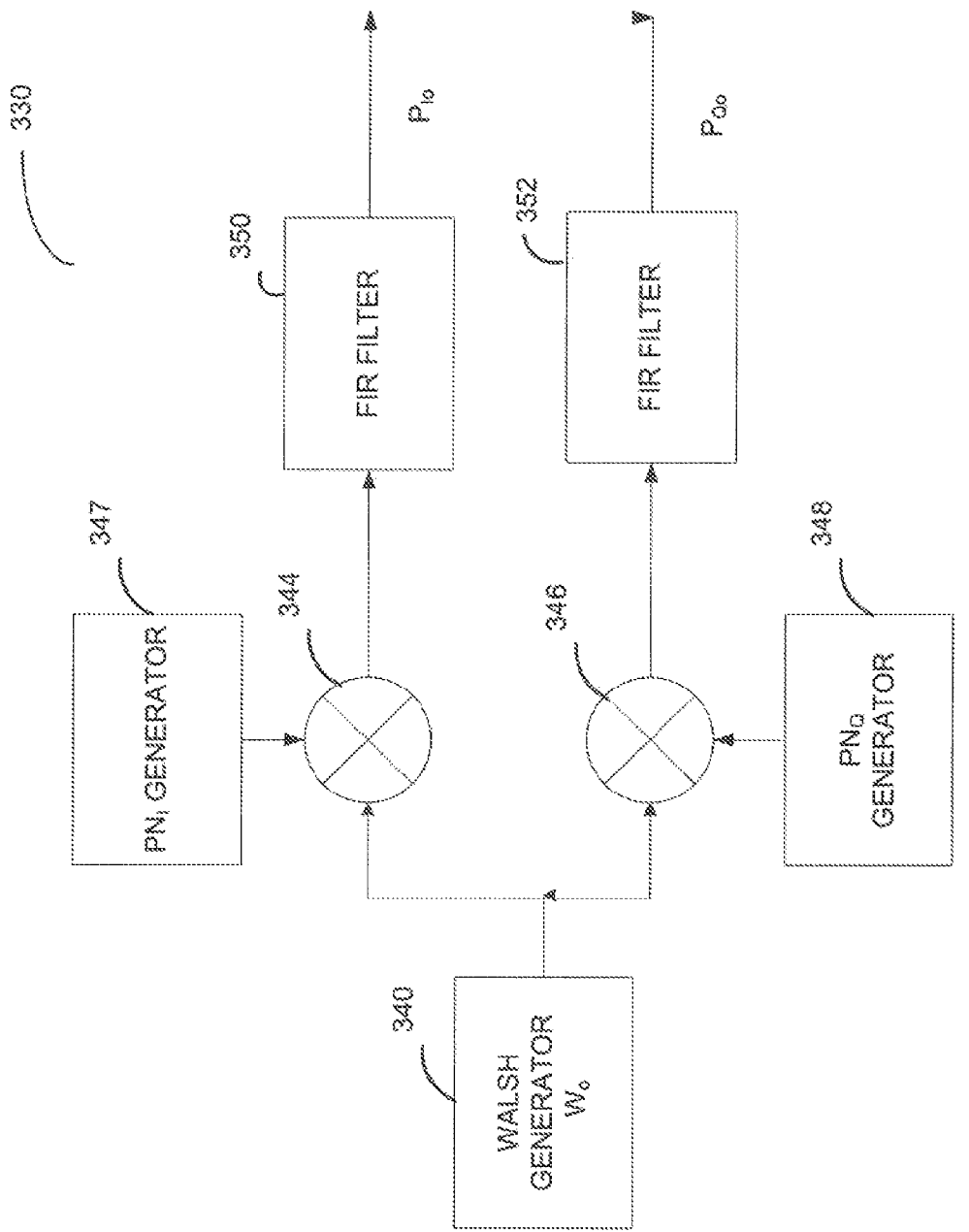
FIG. 8 depicts a pilot generation network for providing I and Q channel pilot sequences.

Referring to FIG. 8, a pilot generation network 330 includes a Walsh generator 340 for providing the Walsh "zero" $W_o$ sequence consisting of all zeroes to exclusive-OR combiners 344 and 346. The Walsh sequence $W_o$ is multiplied by the $PN_I$ and $PN_Q$ sequences supplied by $PN_I$ generator 347 and $PN_Q$ generator 348 using the exclusive-OR combiners 344 and 346, respectively. Since the sequence $W_o$ includes only zeroes the information content of the resultant sequences depends only upon the $PN_I$ and $PN_Q$ sequences. The sequences produced by exclusive-OR combiners 344 and 346 are provided as inputs to Finite Impulse Response Filters (FIR) filters 350 and 352. The filtered sequences output from FIR filters 350 and 352, respectively corresponding to I-channel and Q-channel pilot sequences $P_I$ and $P_Q$, are supplied to the RE transmitter 382.

Figure 9:
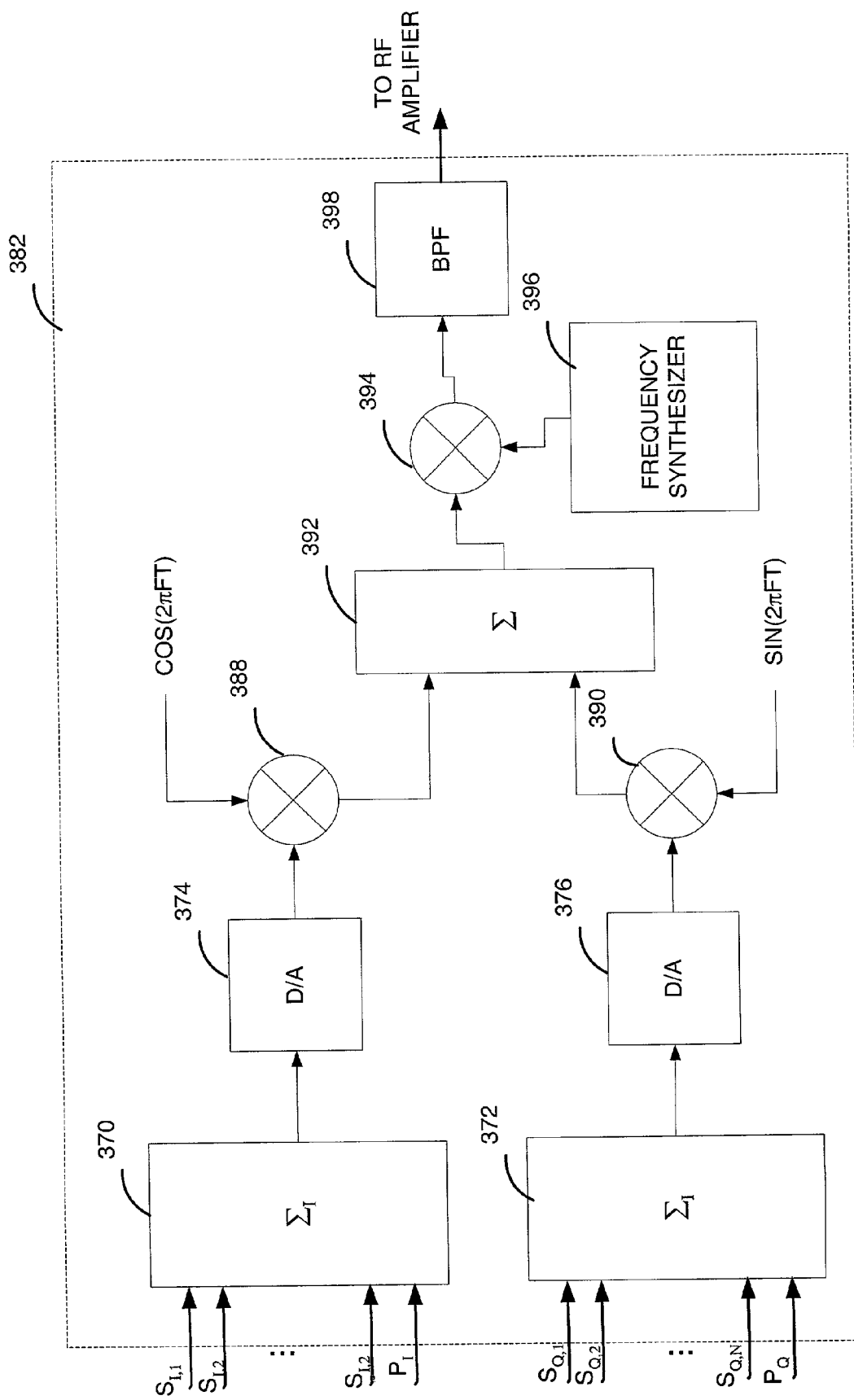
FIG. 9 shows an exemplary implementation of an RF base station transmitter.

Referring to FIG. 9, there is shown an exemplary implementation of the RF transmitter 382. Transmitter 382 includes an I-channel summer 370 for summing the PN.sub.I spread data signals S.sub.Ii, i=1 to N, with the I-channel pilot P.sub I. Similarly a Q channel summer 372 serves to combine the PN.sub.Q spread data signals S.sub.Qi, i=1 to N with the Q-channel pilot P.sub.I. Digital to analog (D/A) converters 374 and 376 are provided for converting the digital information from the I-channel and Q-channel summers 370 and 372, respectively, into analog form. The analog waveforms produced by D/A converters 374 and 376 are provided along with local oscillator (LO) carrier frequency signals Cos(2IIFT) and Sin(2 IIFT), respectively, to mixers 388 and 390, where they are mixed and provided to summer 392. The quadrature phase carrier signals Sin(2z,900 ft) and Cos(2z,900 ft) are provided from suitable frequency sources (not shown). These mixed IF signals are summed in summer 392 and provided to mixer 394

Mixer 394 mixes the summed signal with an RF frequency signal from frequency synthesizer 396 so as to provide frequency upconversion to the RF frequency band. The RF signal includes in-phase (I) and quadrature phase (Q) components, and is bandpass filtered by bandpass filter 398 and output to one of the RF amplifiers 58, 60, 62 (FIG. 2). It should be understood that differing implementations of the RF transmitter 382 may employ a variety of signal summing, mixing, filtering and amplification techniques not described herein, but which are well known to those in the art.

Figure 10:
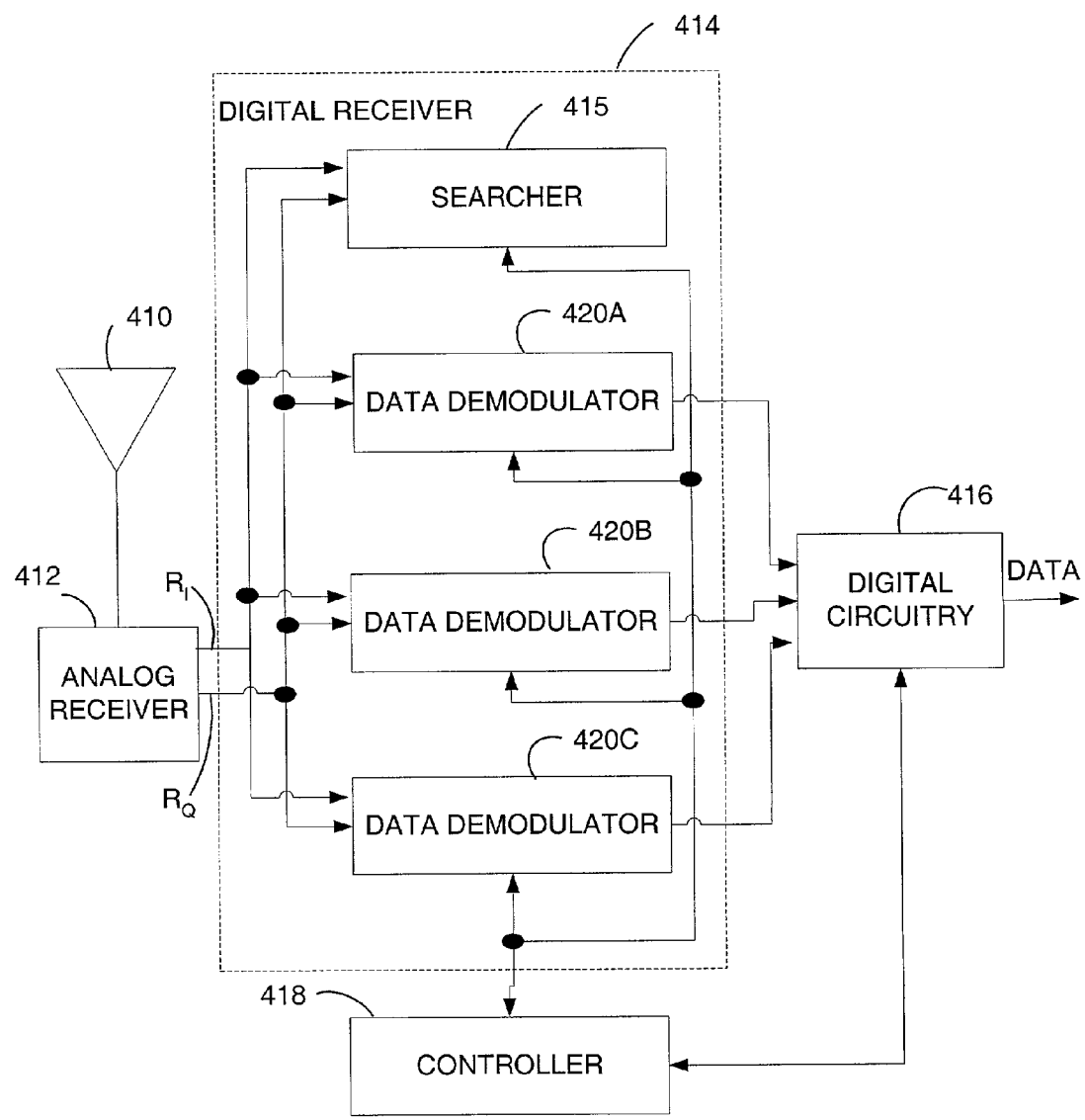
FIG. 10 is a block diagram of an exemplary diversity receiver disposed within a subscriber unit.

FIG. 10 is a block diagram of an exemplary diversity receiver associated with one of the subscriber units 12 (FIG. 1A), and hence is disposed to receive the RF signals transmitted by one or more of the antennas 85-90 of the base station 40 (FIG. 2). In FIG. 10, the RF signal transmitted by base station 40 is received by antenna 410 and provided to a diversity RAKE receiver which is comprised of analog receiver 412 and digital receiver 414. The signal, as received by antenna 410 and provided to analog receiver 412, may be comprised of multipath propagations of the same pilot and data signals intended for individual or multiple subscriber receivers. Analog receiver 412, which is configured in the exemplary embodiment as a QPSK modem, frequency downconverts, and digitizes the received signal into composite I and Q components. The composite I and Q components are provided to digital receiver 414 for demodulation. The demodulated data is then provided to digital circuitry 416 for combining, deinterleaving and decoding.

Each I and Q component output from analog receiver 412 may be comprised of corresponding data signals transmitted by two or more of the antennas 85-90 associated with adjacent coverage areas C1-C6 of a given user sector. As discussed above, a phase offset is introduced between the data signals provided to adjacent coverage areas in a particular user sector. In digital receiver 414 the received signals associated with each coverage area, as selected by a searcher receiver 415 in combination with a controller 418, are each processed by a different one of multiple data receivers or demodulators 420A-420C, which are also referred to as "fingers". Although only three data demodulating fingers (demodulators 420A-420C) are illustrated in FIG. 10, it should be understood that more or less fingers may be used. From the composite I and Q components, each finger extracts, by despreading, the I and Q components RI and RQ of the pilot and data signals associated with each coverage area.

In an exemplary implementation, each subscriber unit 12 is assigned one of a set of a set of 64 orthogonal Walsh codes $W_i$ of length 64. This allows a set of channels including a pilot channel, 63 I-channel, and 63 O-channels to be transmitted using a given pair of spreading sequences $PN_I$ and $PN_Q$. The extracted pilot signal is used for time alignment within a symbol combiner (not shown) within the subscriber unit receiver. When the subscriber unit is positioned proximate the boundary of adjacent coverage areas assigned to the same user sector, the estimates of the data transmitted to each coverage area are time-aligned and added together, thereby improving signal-to-noise-ratio.

V. Dynamic Sectorization Using In-Phase Beam Pattern

As was discussed above, in the preferred embodiment a delay is introduced between the beams projected to adjacent antenna coverage areas so as to decorrelate the signals transmitted to each area. This approach is designed to substantially eliminate destructive interference between the beams provided to adjacent coverage areas, thereby preventing the formation of nulls and other beam pattern distortion. A diversity receiver associated with a subscriber unit positioned near the coverage area boundary is thus able to separately receive the decorrelated signals, and to subsequently combine the separately received signals.

Figure 11A:
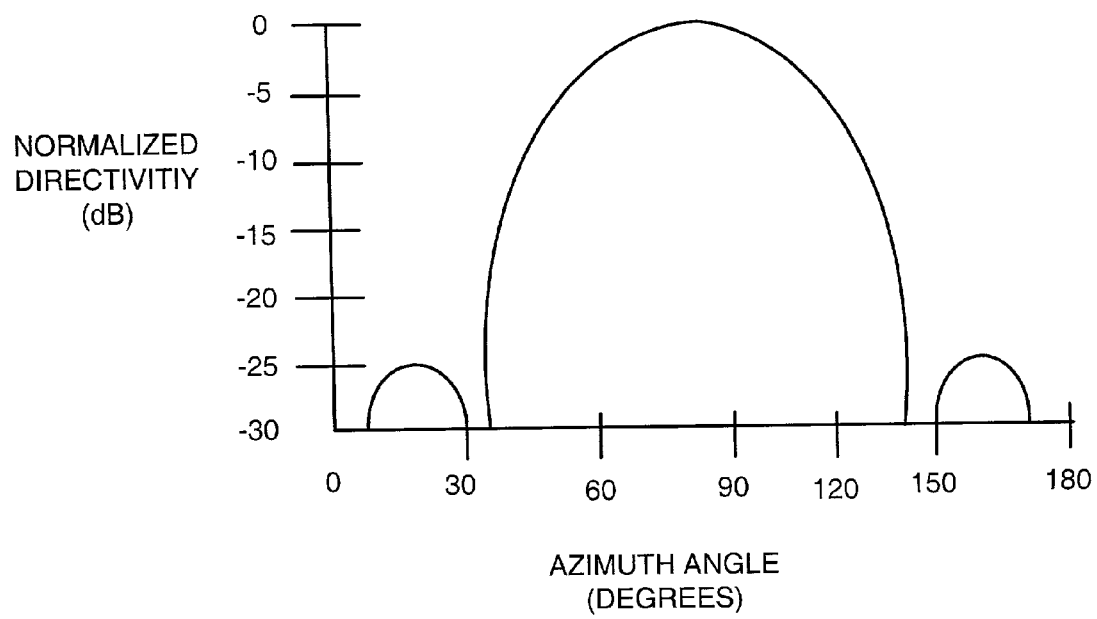
FIG. 11A illustratively represents the azimuth pattern of a 40 degree fixed-beam assumed to be projected by a first base station antenna associated with one of the coverage areas C1-C6 (FIG. 1A).
Figure 11B:
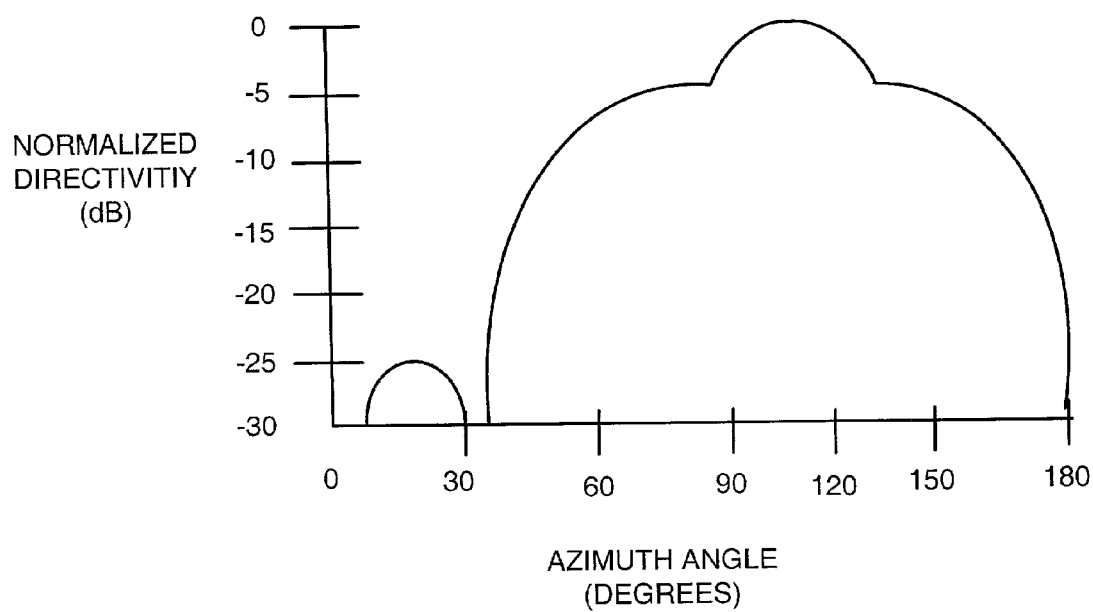
FIG. 11B illustratively represents the azimuth pattern produced when an adjacent pair of fixed-beam base station antennas are driven in phase.

In an alternate embodiment of the invention the cellular base station is designed to effect dynamic user sectorization by providing a set of fixed-beams projected in precise phase alignment. Referring to FIG. 11A, there is shown the azimuth pattern of a 40 degree fixed-beam assumed to be projected by a first base station antenna, associated with one of the coverage areas C1-C6 (FIG. 1A). If a second base station antenna, disposed to provide a second 40 degree fixed-beam to an adjacent coverage area, is driven in phase with the first base station antenna the pattern shown in FIG. 11B is produced. It is thus apparent that the width of a user sector may be increased in proportion to the number of beams excited. Since the beams are generated in phase, the beams constructively interfere near coverage area boundaries and hence are effectively coherently combined within the base station rather than within the subscriber unit receiver.

Figure 12:
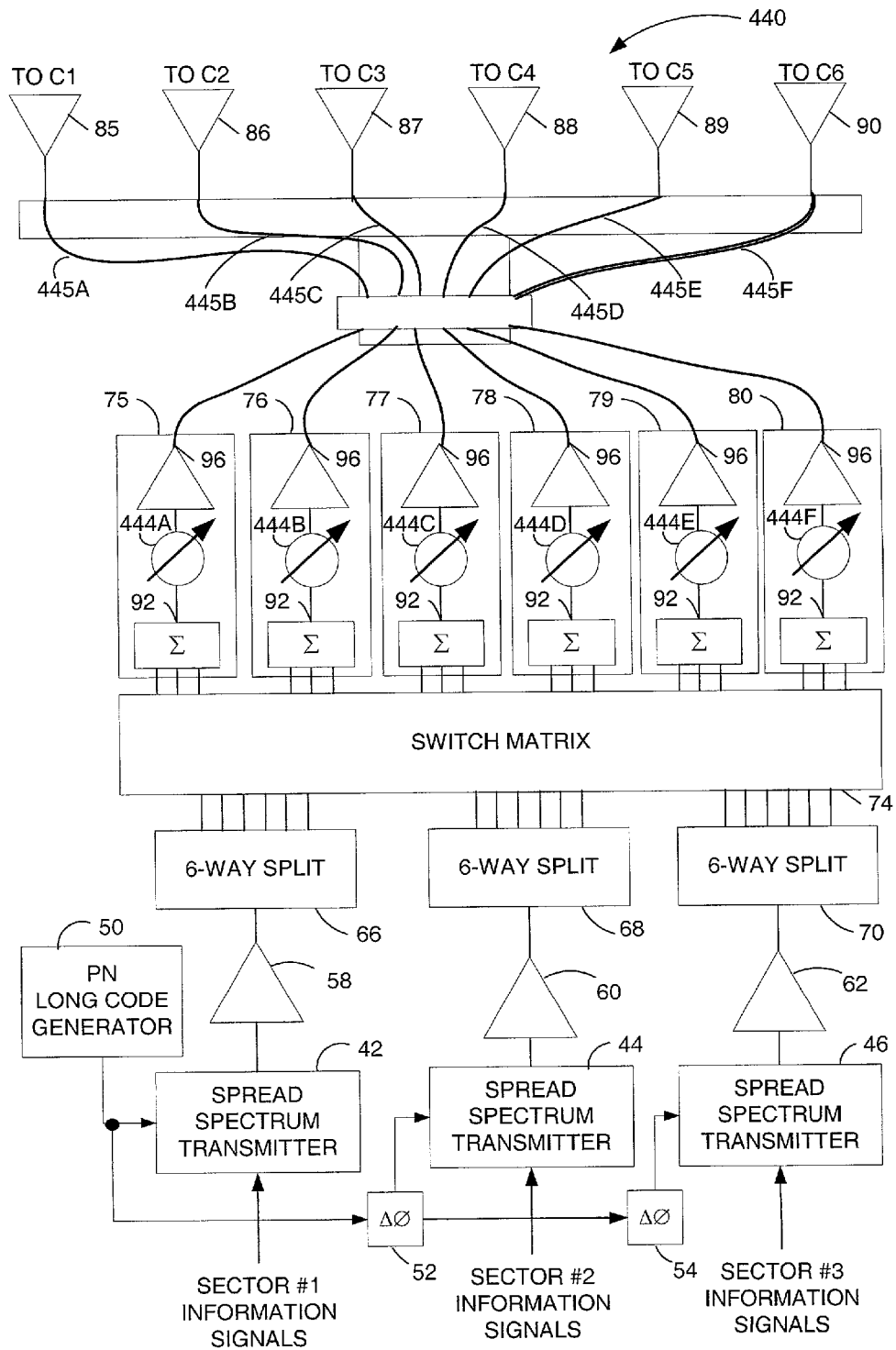
FIG. 12 shows a block diagrammatic representation of a base station transmitter network configured to provide dynamic user sectorization by projecting a set of in-phase beams to each user sector.

Referring to FIG. 12, there is shown a block diagrammatic representation of a base station transmitter network 440 configured to provide dynamic user sectorization by projecting a set of in-phase beams to each user sector. The network 440 is seen to be substantially similar to the network of FIG. 2, where like reference numerals are used in identifying substantially similar system components. Rather than including phase delay elements 95A-95F, the antenna drivers 75-80 are seen to include phase equalizers 444A-444F adjusted such that the antennas 85-90 are driven in phase. Adjustment of the equalizers 444A-444F may be performed, for example, during base station installation by applying an identical test signal to each driver 75-80.

More specifically, during a calibration procedure a set of test signals of identical amplitude and phase are provided to the antenna drivers 75-80. The outputs of adjacent pairs of antenna cables 445A-445F, respectively associated with the antennas 85-90, are then connected to the dual input ports of a power combiner. The phase equalizer within the antenna driver coupled to one of the antenna cables is then adjusted until the output of the power combiner is maximized. This procedure is repeated for each adjacent pair of antenna drivers, i.e., for the drivers 75 and 76, the drivers 76 and 77, and so on.

An analogous procedure is used to calibrate the receive network 200 (FIG. 6). In particular, a set of test signals of identical amplitude and phase are injected at the ports of the antenna cables 224A-224F nominally coupled to the antennas 85-90. A power combiner having six input ports and a single output port is then connected to the splitters 230 of an adjacent pair of the receive amplifiers 210-215. A phase equalizer (not shown) within one of the receive amplifiers connected to the power combiner is then adjusted until output power from the combiner is maximized. This process is then repeated for each adjacent pair of receive amplifiers 210-215.

Figure 13:
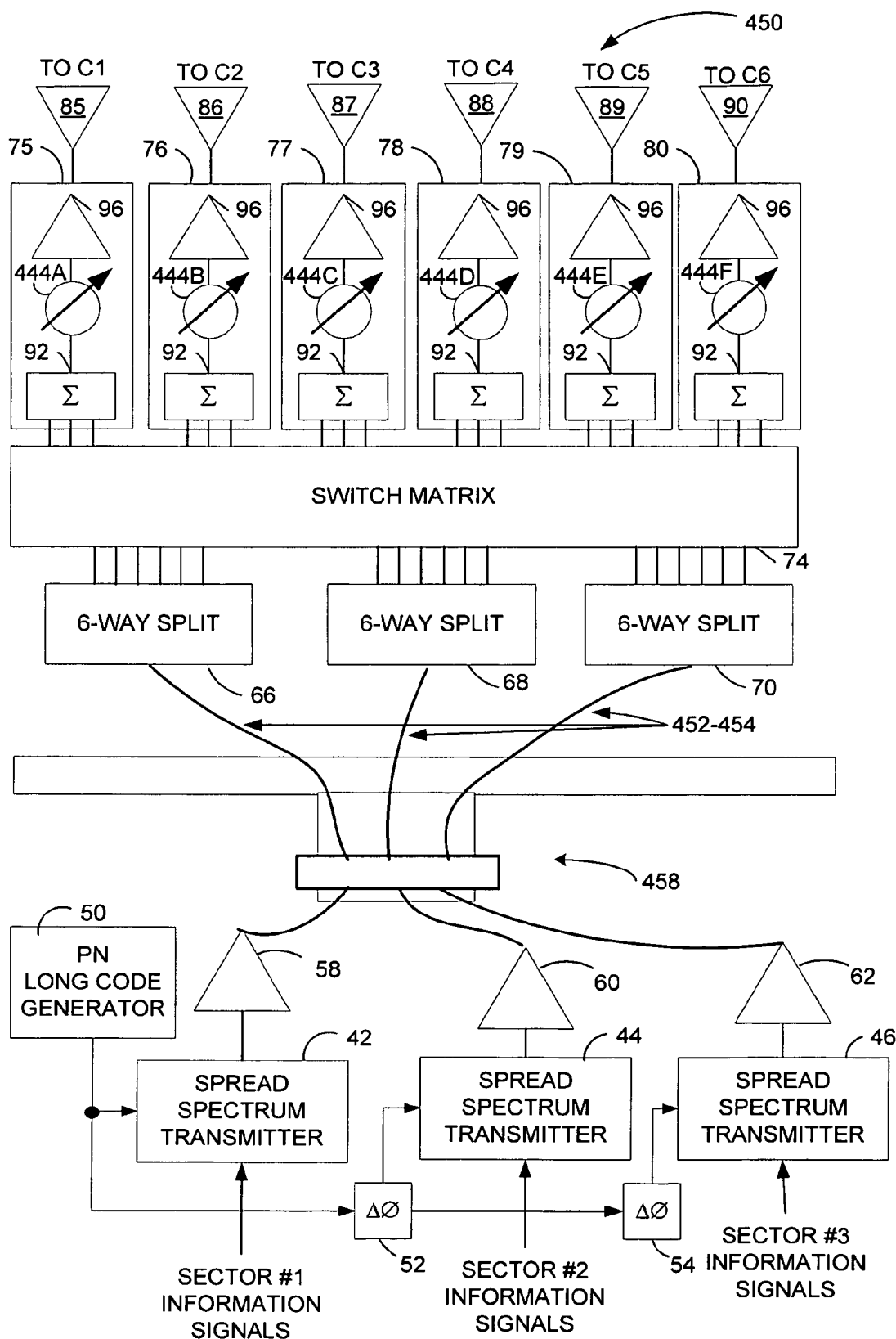
FIG. 13 depicts an alternate base station configuration for providing dynamic user sectorization by projecting a set of in-phase beams.

FIG. 13 depicts an alternate base station configuration 450 for providing dynamic user sectorization by projecting a set of in-phase beams. As is indicated by FIG. 13, phase alignment is maintained between adjacent beams by locating the switch matrix and antenna drivers proximate the antennas 85-90. That is, in the configuration of FIG. 13 the switch matrix 74 and antenna drivers 85-90 follow, rather than precede, the transmission cables 452-454 within the base station antenna tower 458. The direct coupling of the drivers 75-80 to the antennas 85-90 advantageously prevents phase differences due to cable length variations and the like from being introduced between the beams transmitted to adjacent coverage areas.

VI. Antenna Subsystem

In both the decorrelated phase and controlled phase embodiments of the invention (see, e.g., FIGS. 2 and 12), the size of a given user sector is varied by using a combination of one or more beams to provide the information signal for the sector. Each such beam may be created using any one of a number of conventional techniques. For example, a set of distinct fixed-beam antennas could be used to project a set of beams of predetermined angle. In this approach the antennas are mounted and aligned such that each beam encompasses a predetermined coverage area. In an exemplary embodiment a set of six antennas are used to provide a 60 degree beam to each of six coverage areas (see, e.g., FIG. 1A).

Figure 14:
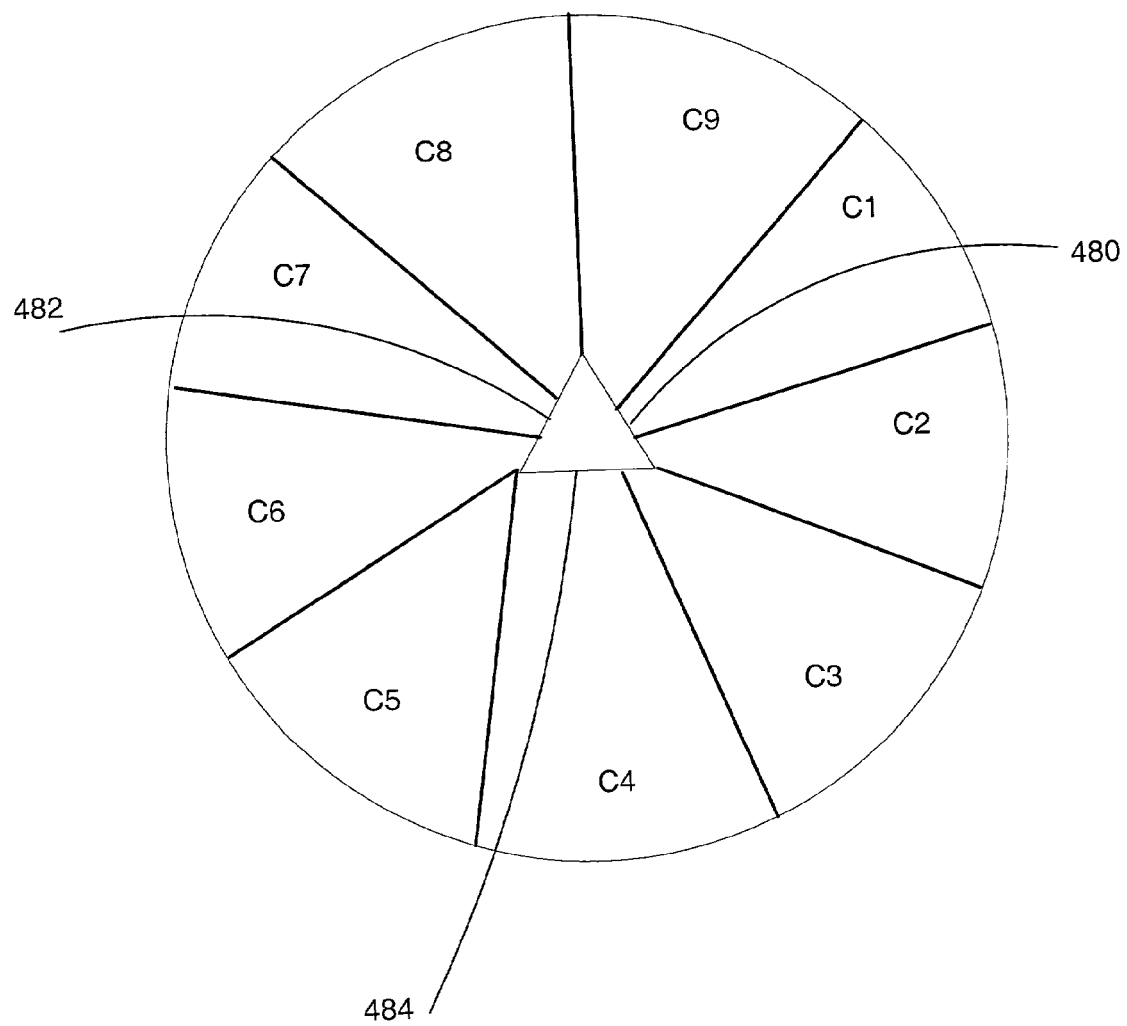
FIG. 14 shows a triangular arrangement of first, second and third phased array antenna panels collectively operating to provide a set of nine antenna beams.

Alternately, a phased array antenna may be used to simultaneously form more than a single beam. For example, FIG. 14 shows a triangular arrangement of first, second and third phased array antenna panels 480, 482 and 484, which collectively operate to provide a set of nine antenna beams to coverage areas C1-C9). In particular, antenna panel 480 projects three 40-degree fixed-beams to coverage areas C1, C2 and C9, while antenna panels 484 and 482 project 40-degree fixed-beams to coverage areas C3-C5, and C6-C8, respectively.

Figure 15:
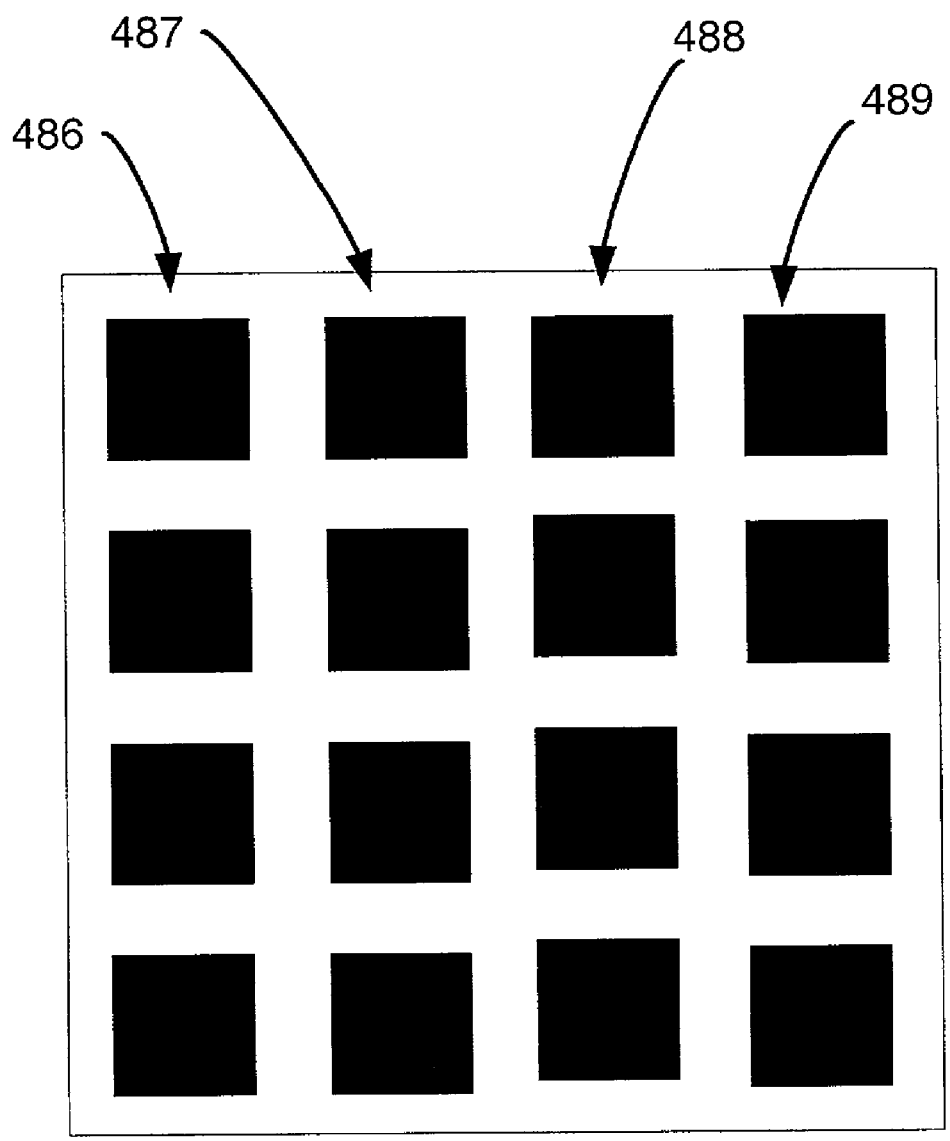
FIG. 15 depicts a preferred implementation of the antenna panels of FIG. 14, each of which includes a 4×4 array of patch elements.

As is indicated by FIG. 15, in a preferred implementation the face of each antenna panel includes a 4.times.4 array of patch elements, the elements within each column being respectively identified by the reference numerals 486-489, Assuming an RF carrier frequency of 850 MHz, each patch element may be fabricated from a square section of dielectrically-loaded patch material of area 4 in.sup.2. This results in each square antenna panel 480-484(FIG. 14) being of an area of approximately 4 sq. ft.

Figure 16:
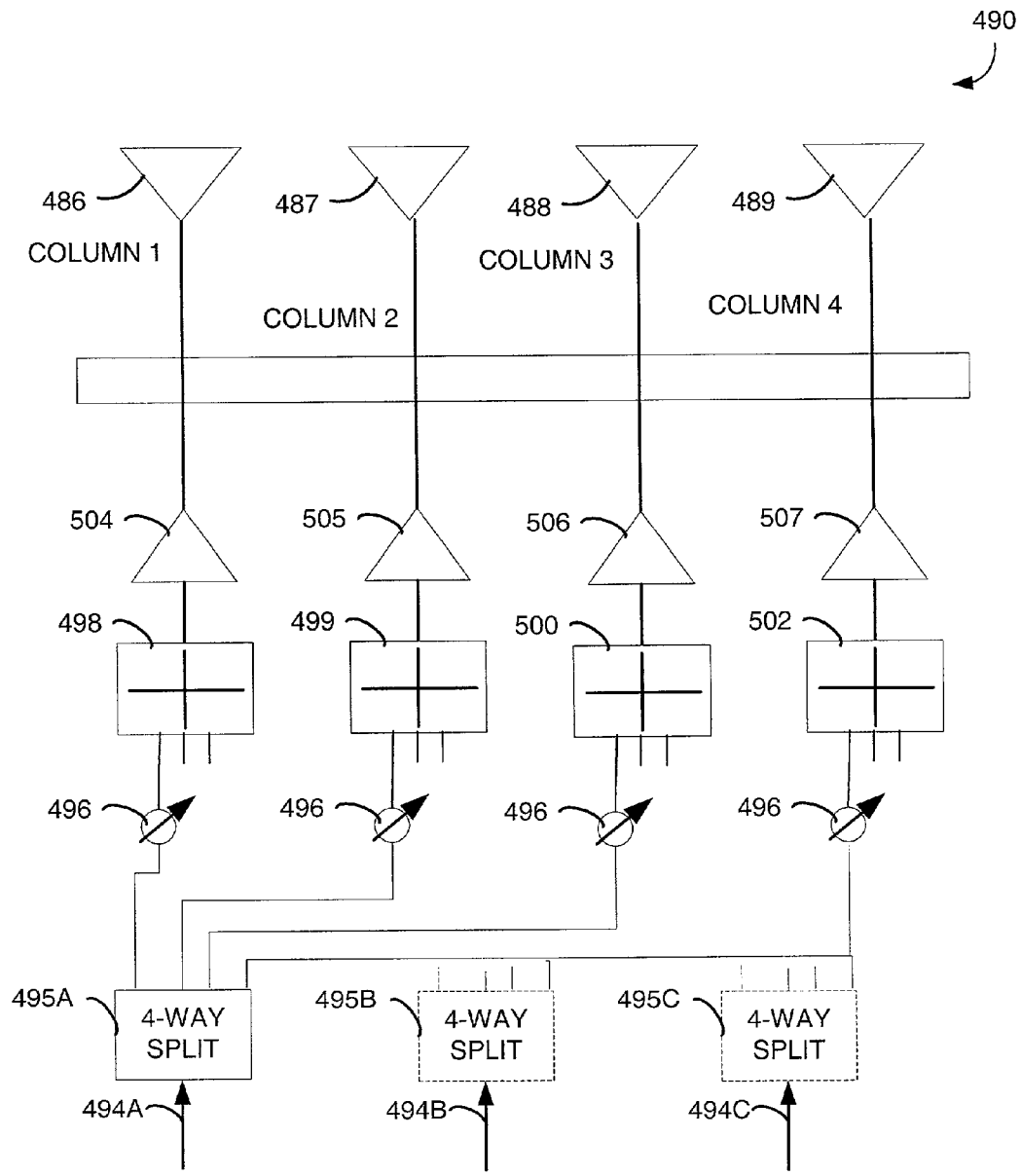
FIG. 16 is a block diagram of a beam-forming network used to drive a phased array antenna panel.

Referring to FIG. 16, there is shown a phased array antenna and beans-forming network 490 disposed to provide three beams from a single antenna face. A switch matrix (not shown) provides the information signals corresponding to user sectors #1, #2 and #3 via input signal lines 494A-494C. The beam-forming network 490 include 4-way splitters 495A-495C, respectively connected to signal lines 494A-494C. The four outputs from each splitter 495A-495C are connected via phase delay elements 496 to one of four summation nodes 498-500 and 502. The composite signals from summation nodes 498-501 are respectively provided to power amplifiers 504-507. As is indicated by FIG. 16, each column of array elements 486-489 is driven by one of the amplifiers 504-507. In alternate implementations, a separate power amplifier is utilized to drive each array element 486-489.

In an exemplary embodiment, the delay elements 496 are adjusted such that each of three beams are projected at a 40-degree angle to one of three adjacent coverage areas. The three beams projected by a single antenna panel would then span an arc of 120 degrees. Three such panels could be mounted to provide a set of nine beams encompassing an arc of 360 degrees.

The previous description of the preferred embodiments is provided to enable any person skilled in the art to make or use the present invention. The various modifications to these embodiments will be readily apparent to those skilled in the art, and the generic principles defined herein may be applied to other embodiments without the use of inventive faculty. Thus, the present invention is not intended to be limited to the embodiments shown herein but is to be accorded the widest scope consistent with the principles and novel features disclosed herein. For example, in addition to addressing the need for flexible traffic channel allocation as a consequence of short-term changes in user demand, the method and apparatus of the invention may be employed to accommodate long-term changes in user demand. Such long-term variation in demand could accompany, for example, shifts in population distribution and building patterns within a given geographic area.

What is claimed is:

1. A method for dynamically varying traffic channel sectorization within a spread spectrum communication system comprising:
   receiving a first PN-modulated signal from a first sector;
   receiving a second PN-modulated signal from a second sector adjacent to said first sector;
   introducing a delay between a pair of PN-modulated signals comprising the first PN-modulated signal and the second PN-modulated signal projected to adjacent coverage areas, whereby said pair of PN-modulated signals are decorrelated; and
   summing a delayed second PN-modulated signal and the first PN-modulated signal.

2. The method as in claim 1, farther comprising:
   splitting the first PN-modulated signal into multiple parts; and
   splitting the second PN-modulated signal into multiple parts.

3. The method as in claim 2, wherein summing further comprises:
   summing one of the multiple parts of the first PN-modulated signal with one of the multiple parts of the second PN-modulated signal to form a first summation signal.

4. The method as in claim 3, wherein summing further comprises:
   summing a second one of the multiple parts of the first PN-modulated signal with a second one of the multiple parts of the second PN-modulated signal to form a second summation signal.

5. The method as in claim 4, further comprising:
   generating an In-phase component and a Quadrature component of the first summation signal; and
   generating an In-phase component and a Quadrature component of the second summation signal.

6. The method as in claim 5, further comprising:
   generating a despreading code;
   despreading the In-phase component and the Quadrature component of the first summation signal with the despreading code;
   offsetting the despreading code by a first phase delay to form a delayed despreading code; and
   despreading the In-phase component and the Quadrature component of the second summation signal with the delayed despreading code.

7. The method of claim 1, further comprising: varying the size of a set of user sectors between successive system operating periods, comprising:
   introducing a delay between said pair of PN-modulated signals projected to adjacent coverage areas within a given user sector;
   discriminating between said pair of PN-modulated signals;
   time-aligning said pair of PN-modulated signals; and
   despreading said pair of PN-modulated signals using a locally-generated replica of a PN long code.

8. The method according to claim 1, wherein said delay has a duration slightly longer than a period of a chip of a PN long code used to decorrelate said pair of PN-modulated signals.

9. A wireless infrastructure for dynamically varying traffic channel sectorization within a spread spectrum communication system, comprising:
   means for receiving a first PN-modulated signal from a first sector;
   means for receiving a second PN-modulated signal from a second sector adjacent to said first sector;
   means for introducing a delay between a pair of PN-modulated signals comprising the first PN-modulated signal and the second PN-modulated signal projected to adjacent coverage areas, whereby said pair of PN-modulated signals are decorrelated; and
   means for summing a delayed second PN-modulated signal and the first PN-modulated signal.

10. The wireless infrastructure of claim 9, further comprising:
    means for splitting the first PN-modulated signal into multiple parts; and
    means for splitting the second PN-modulated signal into multiple parts.

11. The wireless infrastructure of claim 10, wherein the means for summing further sums one of multiple parts of the first PN-modulated signal with one of the multiple parts of the second PN-modulated signal to form a first summation signal.

12. The wireless infrastructure of claim 11, wherein the means for summing further sums a second one of the multiple parts of the first PN-modulated signal with a second one of the multiple parts of the second PN-modulated signal to form a second summation signal.

13. The wireless infrastructure of claim 12, further comprising:
    means for generating an In-phase component and a Quadrature component of the first summation signal; and
    means for generating an In-phase component and a Quadrature component of the second summation signal.

14. The wireless infrastructure of claim 13, further comprising:
    means for generating a despreading code;
    means for despreading the In-phase component and the Quadrature component of the first summation signal with the despreading code;
    means for offsetting the despreading code by a first phase delay to form a delayed despreading code; and
    means for despreading the In-phase component and the Quadrature component of the second summation signal with the delayed despreading code.

15. The wireless infrastructure of claim 9, further comprising:
    means for varying the size of a set of user sectors between successive system operating periods for introducing a delay between said pair of PN-modulated signals projected to adjacent coverage areas within a given user sector;
    means for discriminating between said pair of PN-modulated signals;
    means for time-aligning said pair of PN-modulated signals; and
    means for despreading said pair of PN-modulated signals using a locally-generated replica of a PN long code.

16. The wireless infrastructure of claim 9, wherein said delay has a duration slightly longer than a period of a chip of a PN long code used to decorrelate said pair of PN-modulated signals.

17. A wireless infrastructure to provide dynamic user sectorization by decorrelating signals received from adjacent coverage areas, comprising:
    a plurality of antenna elements, each antenna element associated with a coverage area of a wireless communication system;

a plurality of receive amplifiers, comprising delay elements operably connected to said plurality of antennas, wherein a decorrelating delay is introduced between said signals provided to said adjacent coverage areas, each receive amplifier coupled to one of the plurality of antenna elements;

a switch matrix coupled to the plurality of receive amplifiers; and a plurality of summation networks coupled to the switch matrix and adapted to receive information from each of the plurality of receive amplifiers, wherein the plurality of receivers are operably connected to the plurality of summation networks.

18. A base station receiver network configured to provide dynamic user sectorization by decorrelating delays between received signals from adjacent coverage areas, comprising:

a plurality of antennas;

a first plurality of receive amplifiers comprising a plurality of delay elements operably connected to said plurality of antennas, wherein said decorrelating delays are introduced between said received signals from said adjacent coverage areas;

at least one switch matrix operably connected to said first plurality of receive amplifiers, whereby information from user sectors are routed to users within said adjacent coverage areas;

a plurality of summation networks operably connected to said at least one switch matrix;

a plurality of receivers operably connected to said plurality of summation networks, whereby said received signals are downconverted and digitized into composite I and Q components;

a PN long code generator for providing a PN long code to said plurality of receivers; and a plurality of phase delay elements operably connected to said plurality of receivers for offsetting said PN long code by a predetermined margin.

19. The base station receiver network according to claim 18, further comprising a second plurality of amplifiers operably connected between said plurality of receivers and said plurality of summation networks.

20. The base station receiver network according to claim 18, wherein said plurality of receivers comprises at least one RAKE receiver.

21. The base station receiver network according to claim 18, wherein at least one of the plurality of delay elements is a surface acoustic wave filter.

22. The base station receiver network according to claim 18, wherein at least one of said decorrelating delays is equivalent to 768 chips.

23. The base station receiver network according to claim 20, wherein said at least one RAKE receiver comprises a plurality of demodulators.

24. A computer-readable medium including program code stored thereon comprising:

program code for receiving a first PN-modulated signal from a first sector;

program code for receiving a second PN-modulated signal from a second sector adjacent to said first sector;

program code for introducing a delay between a pair of PN-modulated signals comprising the first PN-modulated signal and the second PN-modulated signal projected to adjacent coverage areas, whereby said pair of PN-modulated signals are decorrelated; and program code for summing a delayed second PN-modulated signal and the first PN-modulated signal.

25. The computer-readable medium of claim 24, further comprising:

program code for splitting the first PN-modulated signal into multiple parts; and program code for splitting the second PN-modulated signal into multiple parts.

26. The computer-readable medium of claim 25, wherein the program code for summing comprises:

program code for summing one of the multiple parts of the first PN-modulated signal with one of the multiple parts of the second PN-modulated signal to form a first summation signal.

27. The computer-readable medium of claim 26, wherein the program code for summing further comprises:

program code for summing a second one of the multiple parts of the first PN-modulated signal with a second one of the multiple parts of the second PN-modulated signal to form a second summation signal.

28. The computer-readable medium of claim 27, further comprising:

program code for generating an In-phase component and a Quadrature component of the first summation signal; and program code for generating an In-phase component and a Quadrature component of the second summation signal.

29. The computer-readable medium of claim 28, further comprising:

program code for generating a despreading code;

program code for despreading the In-phase component and the Quadrature component of the first summation signal with the despreading code;

program code for offsetting the despreading code by a first phase delay to form a delayed despreading code; and program code for despreading the In-phase component and the Quadrature component of the second summation signal with the delayed despreading code.

30. The computer-readable medium of claim 24, further comprising:

program code for varying the size of a set of user sectors between successive system operating periods, wherein the program code for varying comprises:

program code for introducing a delay between said pair of PN-modulated signals projected to adjacent coverage areas within a given user sector;

program code for discriminating between said pair of PN-modulated signals;

program code for time-aligning said pair of PN-modulated signals; and program code for despreading said pair of PN-modulated signals using a locally-generated replica of a PN long code.

31. The computer-readable medium of claim 24, wherein said delay has a duration slightly longer than a period of a chip of a PN long code used to decorrelate said pair of PN-modulated signals.

32. A base station receiver for dynamically varying traffic channel sectorization within a spread spectrum communication system comprising:

at least one antenna for receiving a first PN-modulated signal from a first sector and for receiving a second PN-modulated signal from a second sector adjacent to said first sector;

a delay element coupled to the at least one antenna for introducing a delay between a pair of PN-modulated signals comprising the first PN-modulated signal and the second PN-modulated signal projected to adjacent coverage areas, whereby said pair of PN-modulated signals are decorrelated; and a summation network coupled to the delay element for summing a delayed second PN-modulated signal and the first PN-modulated signal.

33. The base station receiver of claim 32, farther comprising:

at least one splitter coupled to the delay element for splitting the first PN-modulated signal into multiple parts, and for splitting the second PN-modulated signal into multiple parts.

34. The base station receiver of claim 33, wherein the summation network further sums one of the multiple parts of the first PN-modulated signal with one of the multiple parts of the second PN-modulated signal to form a first summation signal.

35. The base station receiver of claim 34, wherein the summation network farther sums a second one of the multiple parts of the first PN-modulated signal with a second one of the multiple parts of the second PN-modulated signal to form a second summation signal.

36. The base station receiver of claim 35, farther comprising:

at least one diversity receiver for generating an In-phase component and a Quadrature component of the first summation signal, and for generating an In-phase component and a Quadrature component of the second summation signal.

37. The base station receiver of claim 36, further comprising a PN code generator for generating a despreading code; and wherein the at least one diversity receiver further despreads the In-phase component and the Quadrature component of the first summation signal with the despreading code, offsets the despreading code by a first phase delay to form a delayed despreading code, and despreads the In-phase component and the Quadrature component of the second summation signal with the delayed despreading code.

38. The base station receiver of claim 32, wherein the at least one antenna varies the size of a set of user sectors between successive system operating periods; and wherein the delay element further introduces a delay between said pair of PN-modulated signals projected to adjacent coverage areas within a given user sector; and further comprising a PN code generator for generating a PN long code to discriminate between said pair of PN-modulated signals, for time-aligning said pair of PN-modulated signals, and for despreading said pair of PN-modulated signals using a locally-generated replica of the PN long code.

39. The base station receiver of claim 32, wherein said delay has a duration slightly longer than a period of a chip of a PN long code used to decorrelate said pair of PN-modulated signals.

* * * * *